United States Patent
Shackell

(10) Patent No.: US 11,816,088 B2
(45) Date of Patent: Nov. 14, 2023

(54) METHOD AND SYSTEM FOR MANAGING CROSS DATA SOURCE DATA ACCESS REQUESTS

(71) Applicant: Anaplan, Inc., San Francisco, CA (US)

(72) Inventor: Thomas Francis Shackell, Leeds (GB)

(73) Assignee: Anaplan, Inc., San Francisco, CA (US)

( * ) Notice: Subject to any disclaimer, the term of this patent is extended or adjusted under 35 U.S.C. 154(b) by 210 days.

(21) Appl. No.: 17/214,311

(22) Filed: Mar. 26, 2021

(65) Prior Publication Data

US 2022/0309050 A1  Sep. 29, 2022

(51) Int. Cl.
*G06F 16/23* (2019.01)
*G06F 16/27* (2019.01)
*G06F 16/176* (2019.01)

(52) U.S. Cl.
CPC ........ *G06F 16/2315* (2019.01); *G06F 16/176* (2019.01); *G06F 16/1774* (2019.01); *G06F 16/2343* (2019.01); *G06F 16/278* (2019.01); *G06F 16/1767* (2019.01); *G06F 16/27* (2019.01)

(58) Field of Classification Search
CPC .............. G06F 16/2315; G06F 16/176; G06F 16/1774; G06F 16/2343; G06F 16/278; G06F 16/1767; G06F 16/27; G06F 16/907; G06F 16/2308; G06F 16/2336; G06F 16/273; G06F 16/275; G06F 16/908; G06F 16/909; G06F 16/2329
See application file for complete search history.

(56) References Cited

U.S. PATENT DOCUMENTS

| | | | |
|---|---|---|---|
| 9,304,815 B1* | 4/2016 | Vasanth | G06F 3/067 |
| 10,685,010 B2* | 6/2020 | Friedman | G06F 11/1076 |
| 10,987,286 B2* | 4/2021 | Trahan | A61K 8/8152 |
| 11,429,311 B1* | 8/2022 | Shackell | G06F 3/0659 |
| 11,475,003 B1* | 10/2022 | Shackell | G06F 16/278 |
| 11,481,378 B1* | 10/2022 | Shackell | G06F 16/278 |
| 2015/0248434 A1* | 9/2015 | Avati | G06F 16/184 707/615 |
| 2017/0054802 A1* | 2/2017 | Annamalai | G06F 16/248 |
| 2017/0310716 A1 | 10/2017 | Lopez Venegas et al. | |
| 2020/0348840 A1* | 11/2020 | Krasner | G06F 3/0674 |
| 2021/0089662 A1* | 3/2021 | Muniswamy-Reddy | H04L 63/166 |
| 2021/0182190 A1 | 6/2021 | Gao et al. | |

* cited by examiner

*Primary Examiner* — Kris E Mackes
*Assistant Examiner* — Cecile H Vo
(74) *Attorney, Agent, or Firm* — Chamberlain, Hrdlicka, White, Williams & Aughtry

(57) ABSTRACT

A node includes storage that stores a portion of high accessibility data corresponding to a shard that is divided into revisions. The portion of the high accessibility data is managed based on an activity state model including a writing state, a resolving state, a metadata update state, and a reading state. The node further includes a repository manager that obtains a cross-shard read request for the high accessibility data; makes a determination that the portion of the high accessibility data is not in the reading state; in response to the determination, adds the cross-shard read request to a delayed action queue at the revision of a last delayed action in the delayed action queue; and after processing the last delayed action in the delayed action queue and while in the resolving state: converts the cross-shard read request to a read request; and processes the read request.

20 Claims, 31 Drawing Sheets

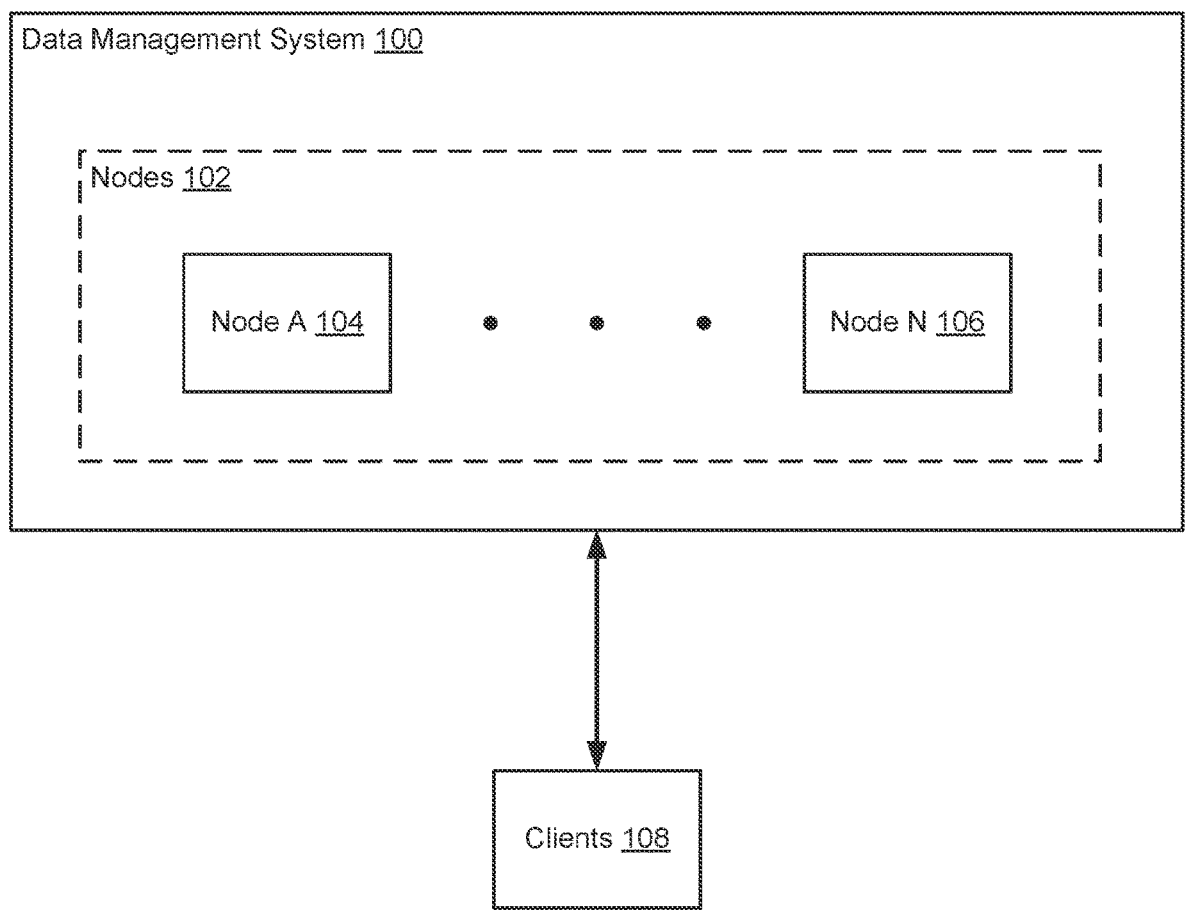
FIG. 1.1

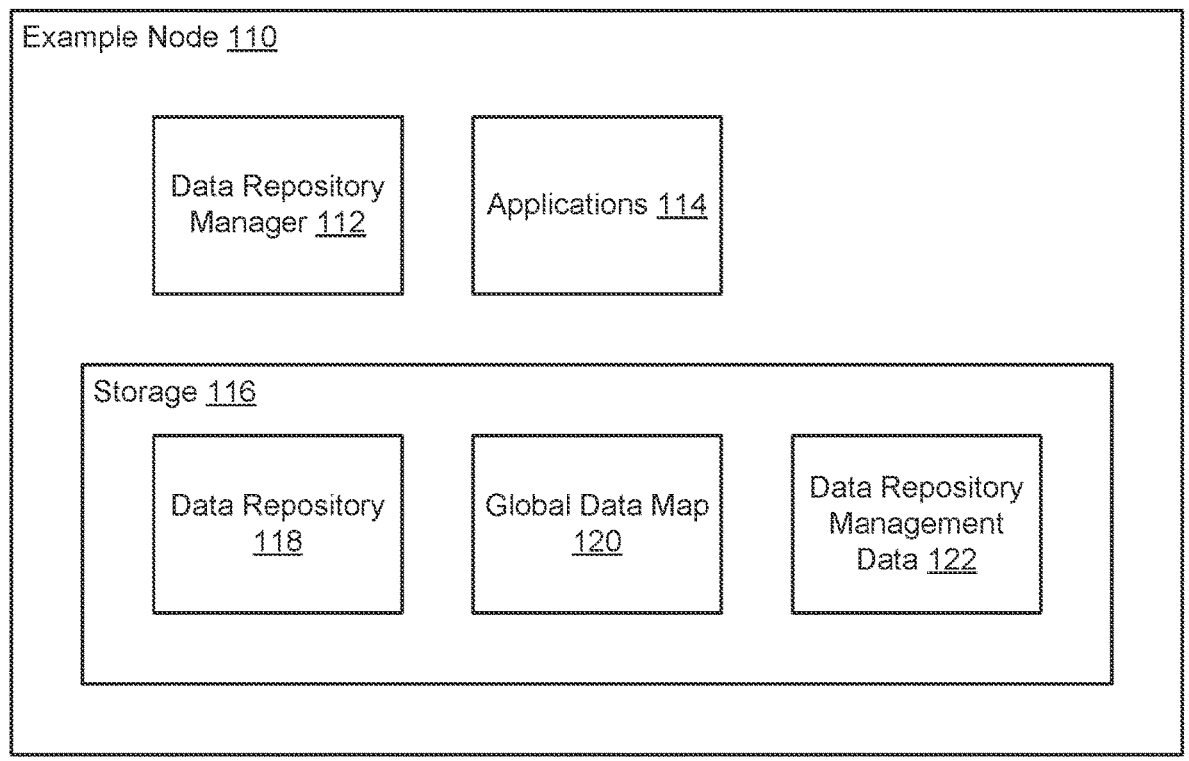
FIG. 1.2

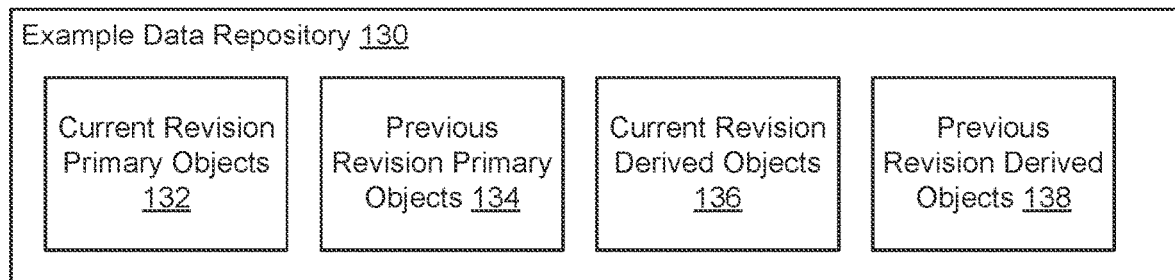
FIG. 1.3
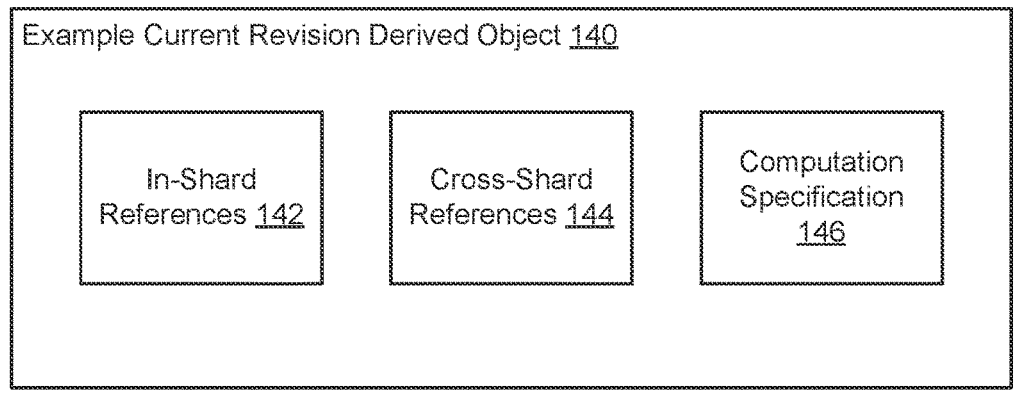
FIG. 1.4
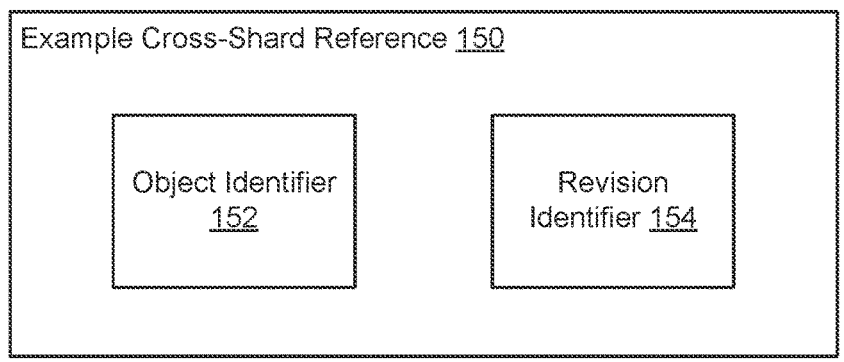
FIG. 1.5

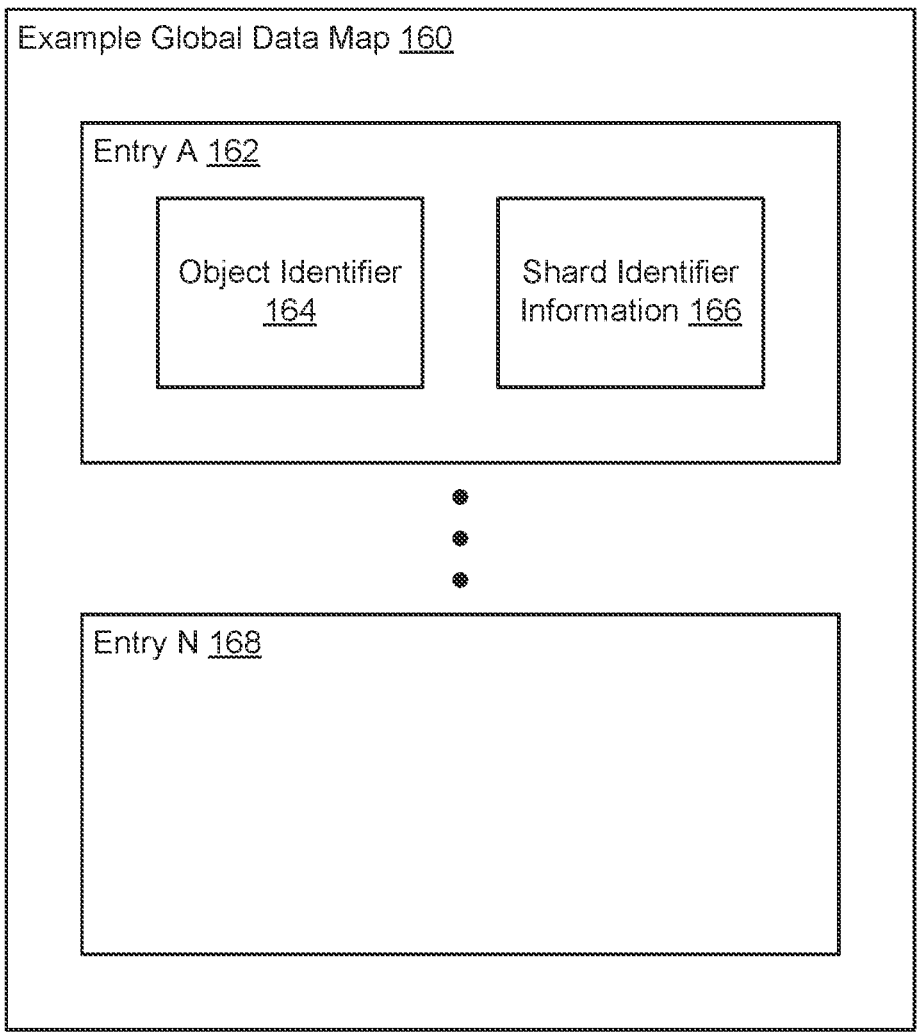
FIG. 1.6

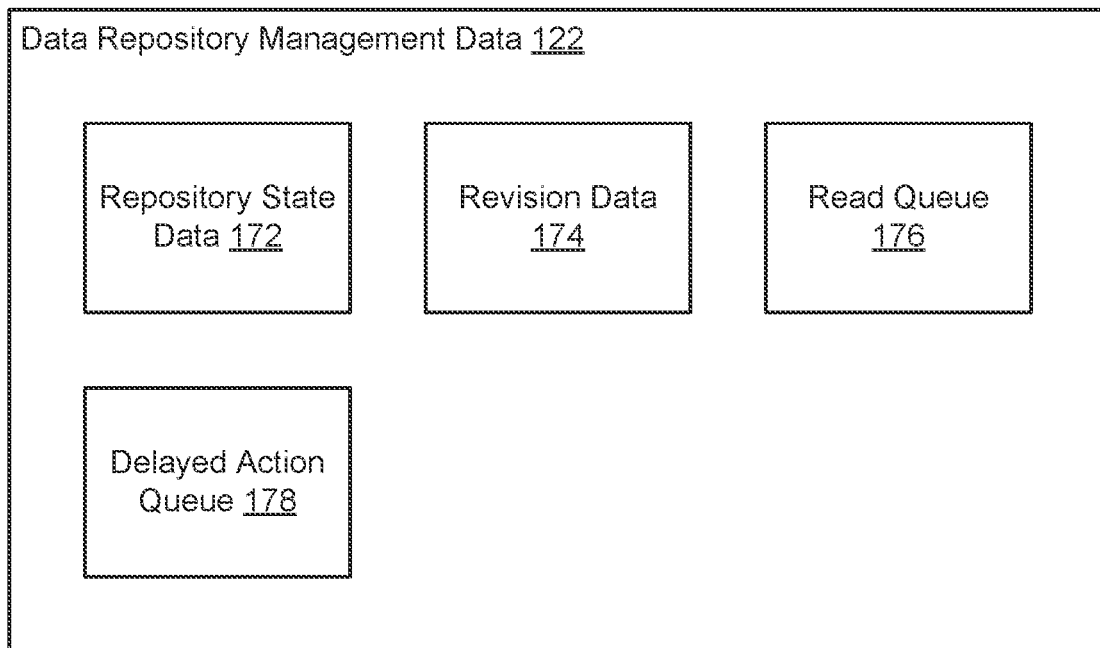
FIG. 1.7
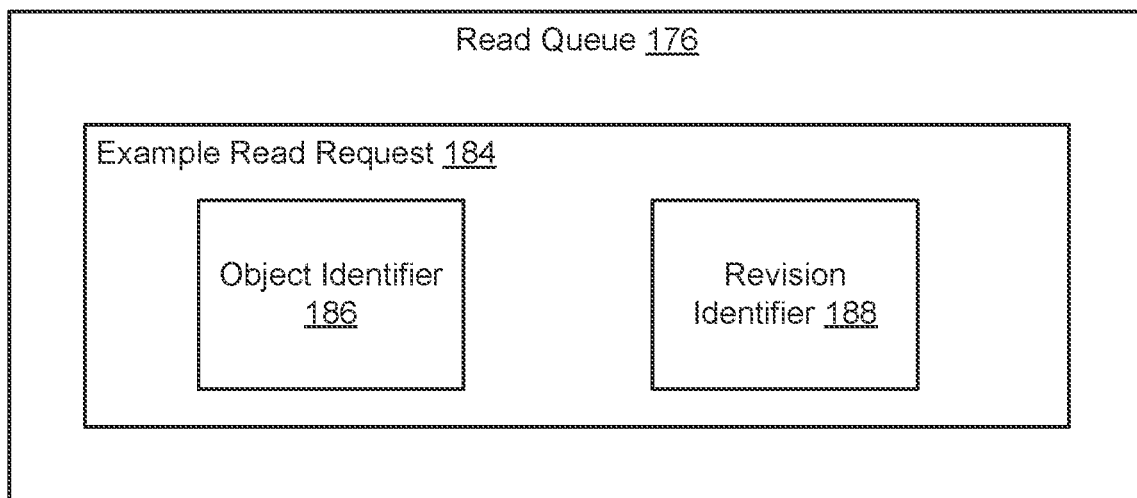
FIG. 1.8

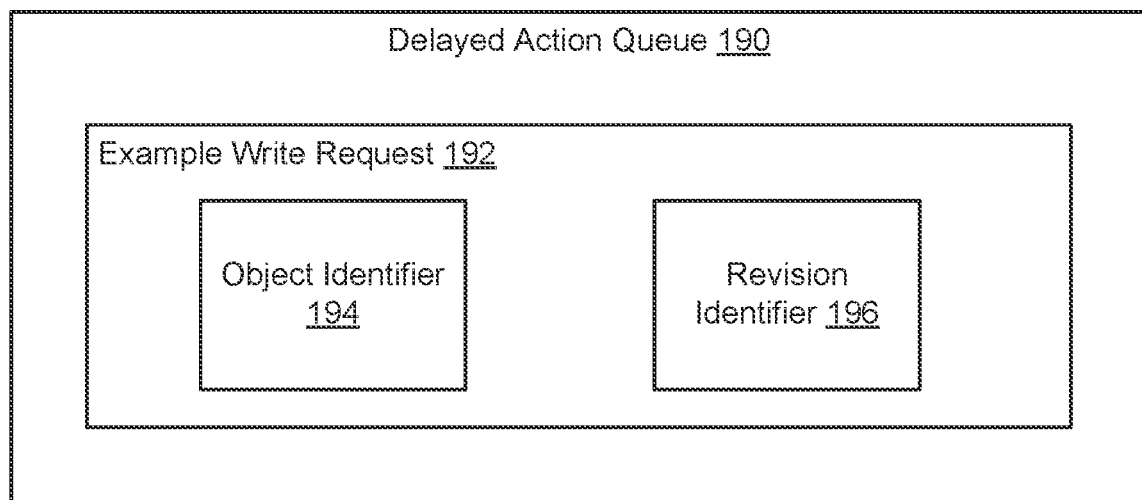
FIG. 1.9

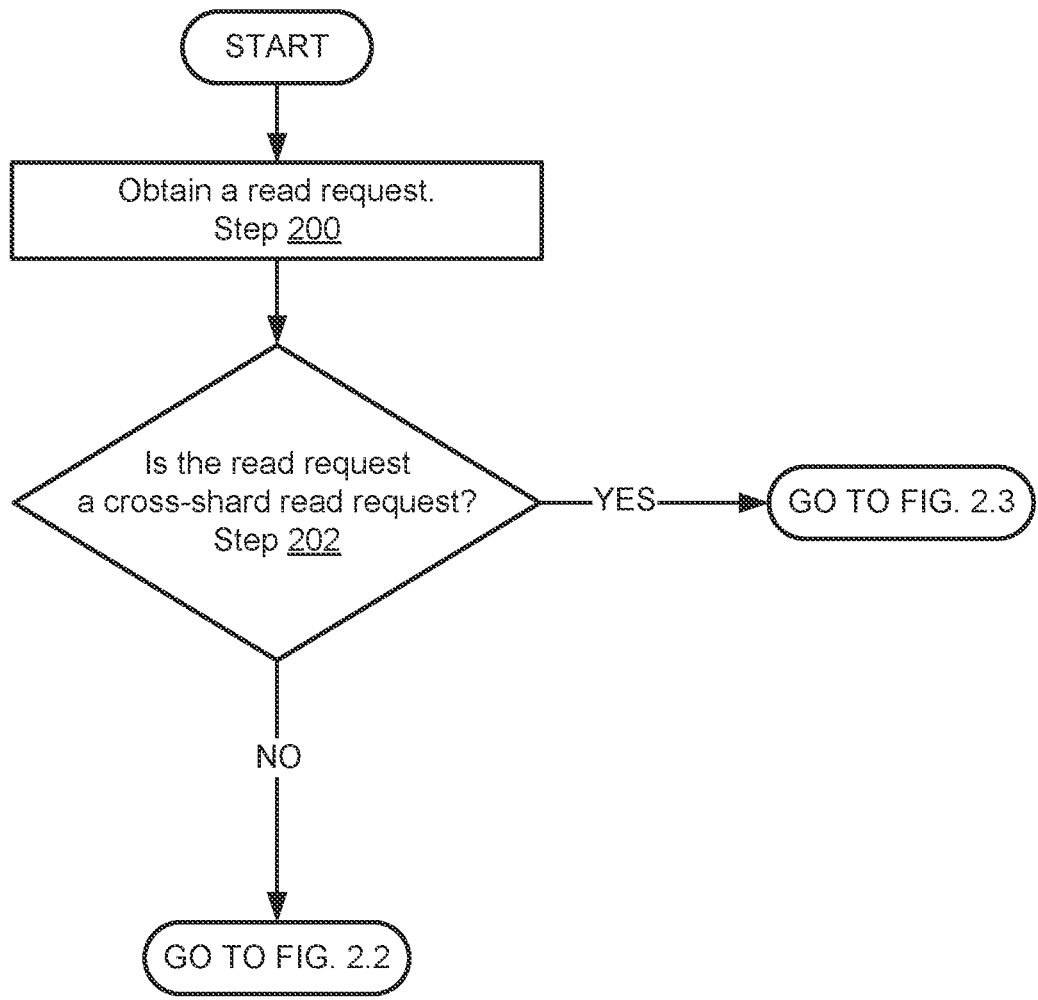
FIG. 2.1

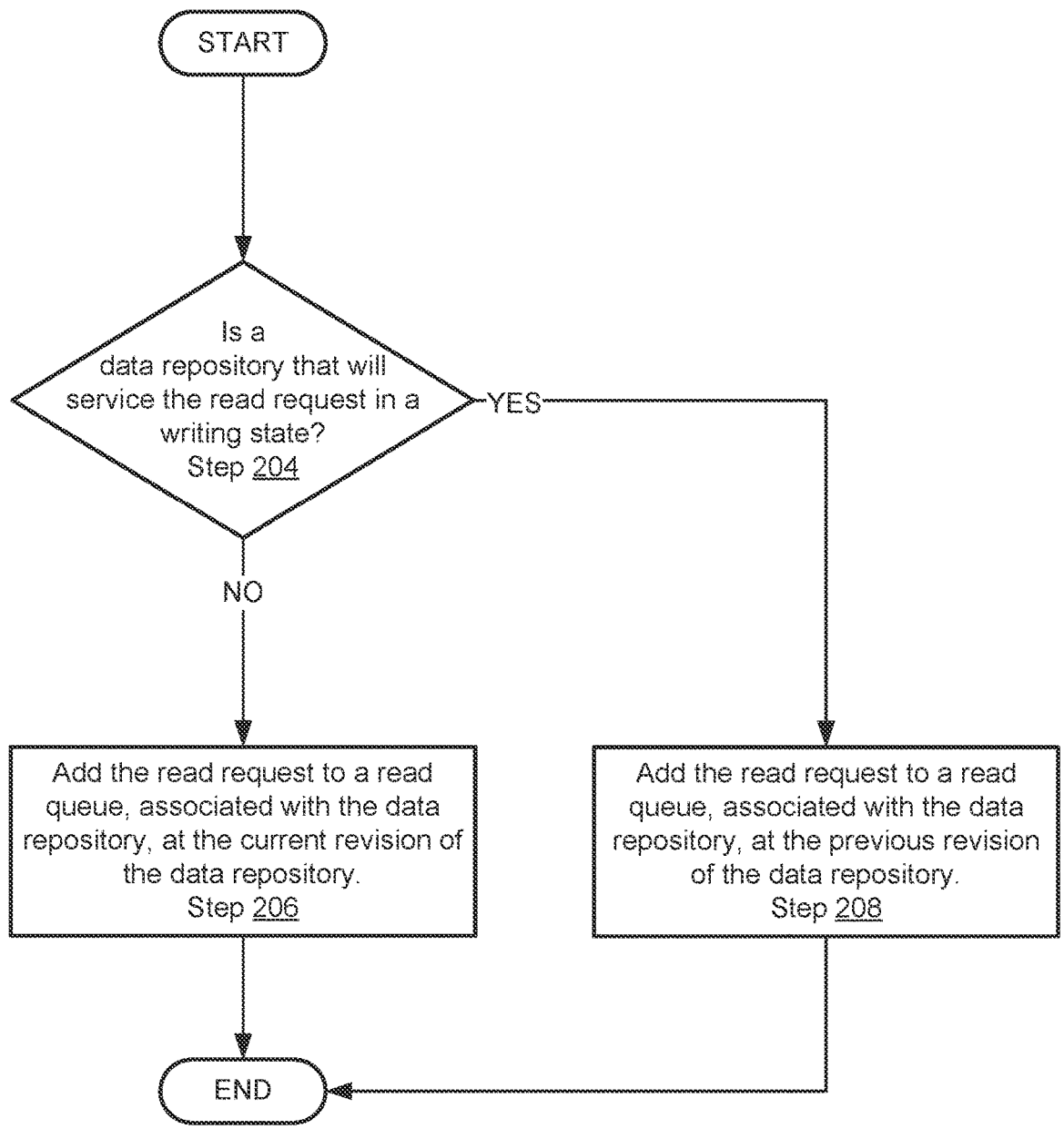
FIG. 2.2

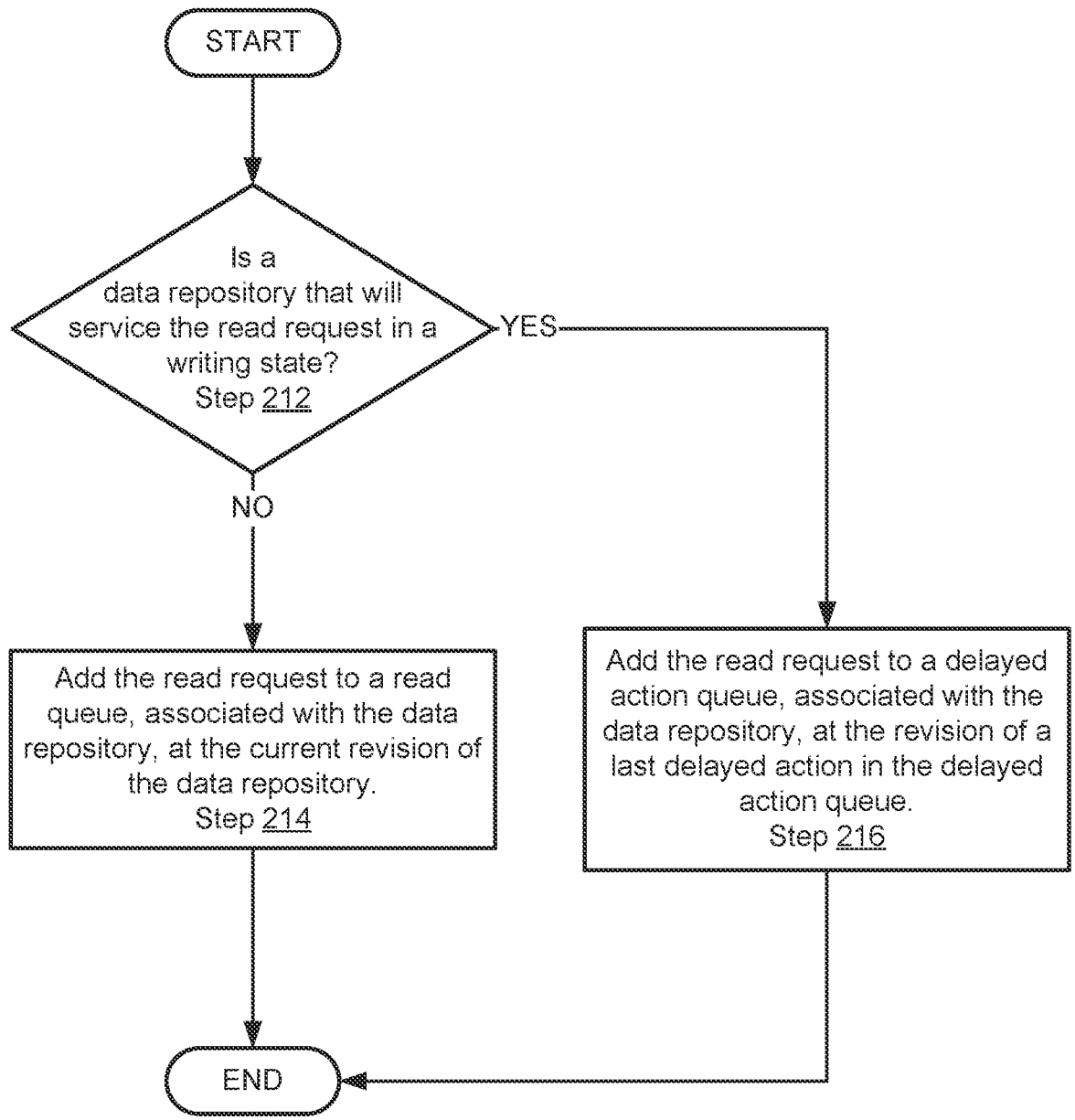
FIG. 2.3

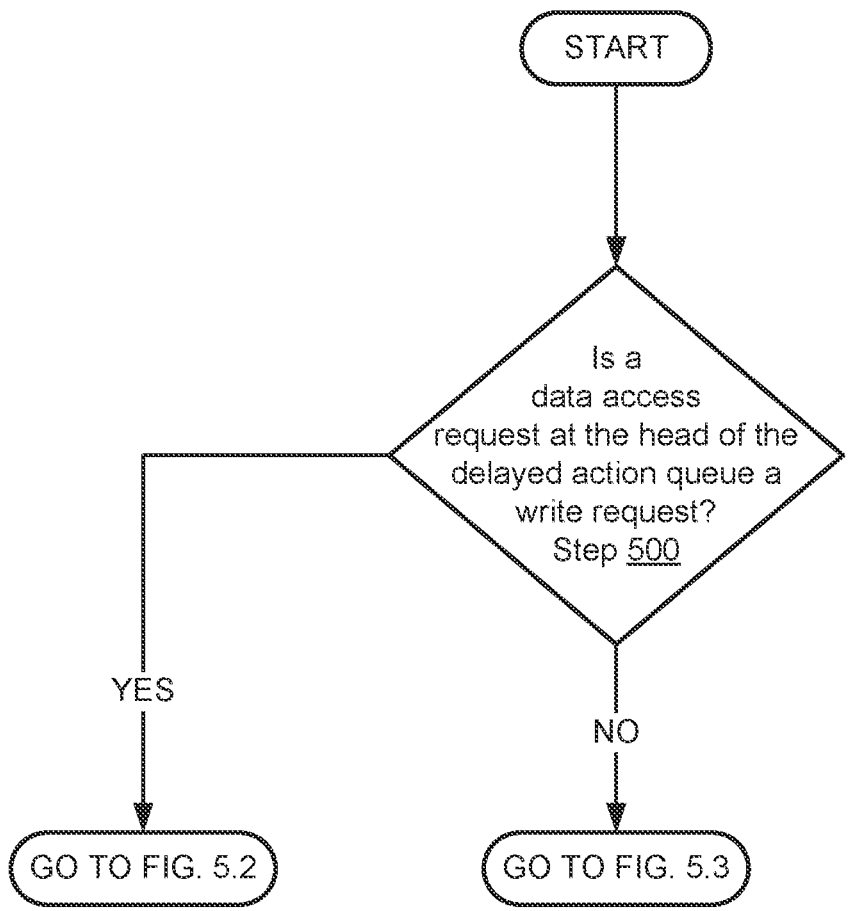
FIG. 5.1

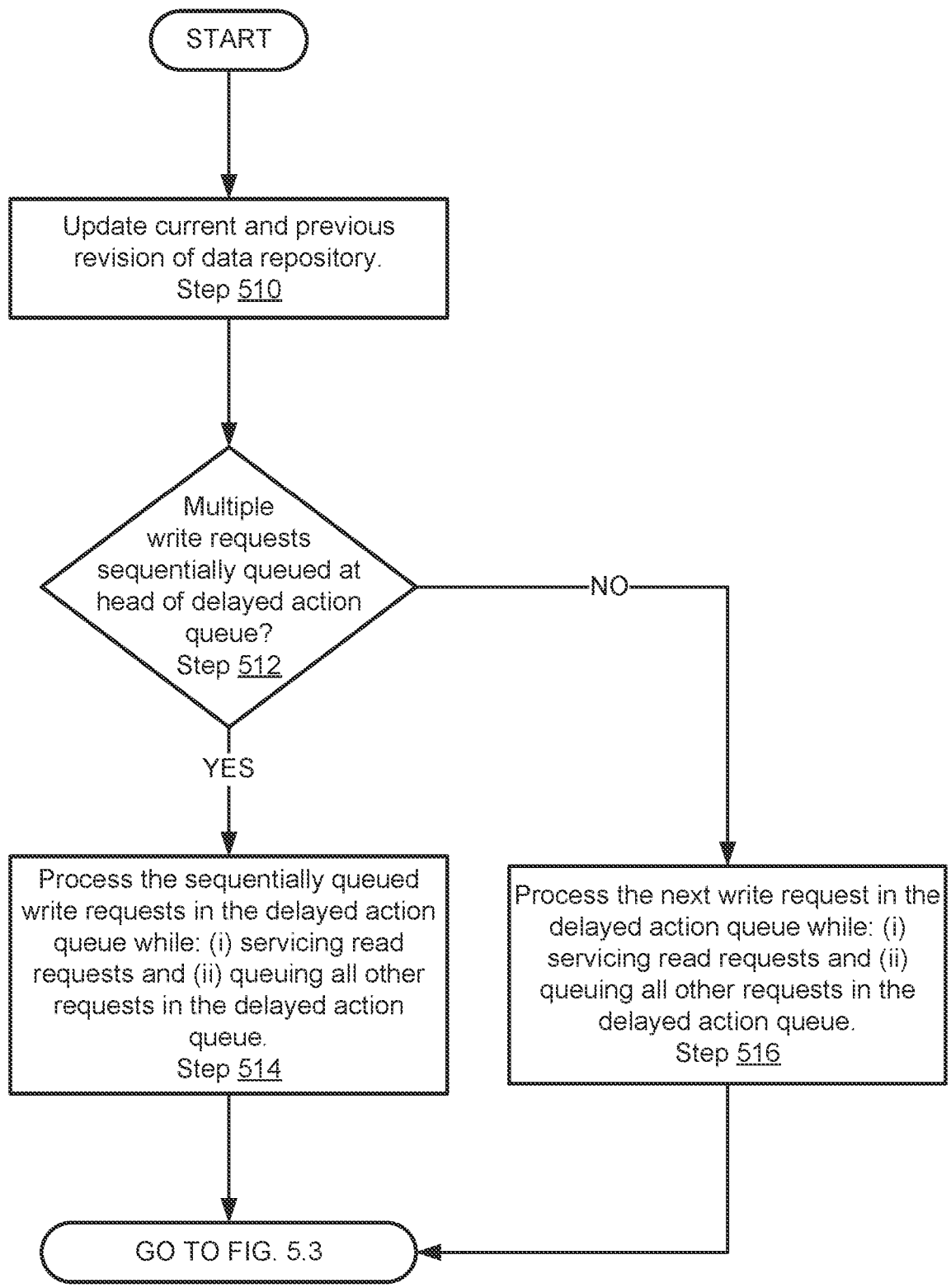
FIG. 5.2

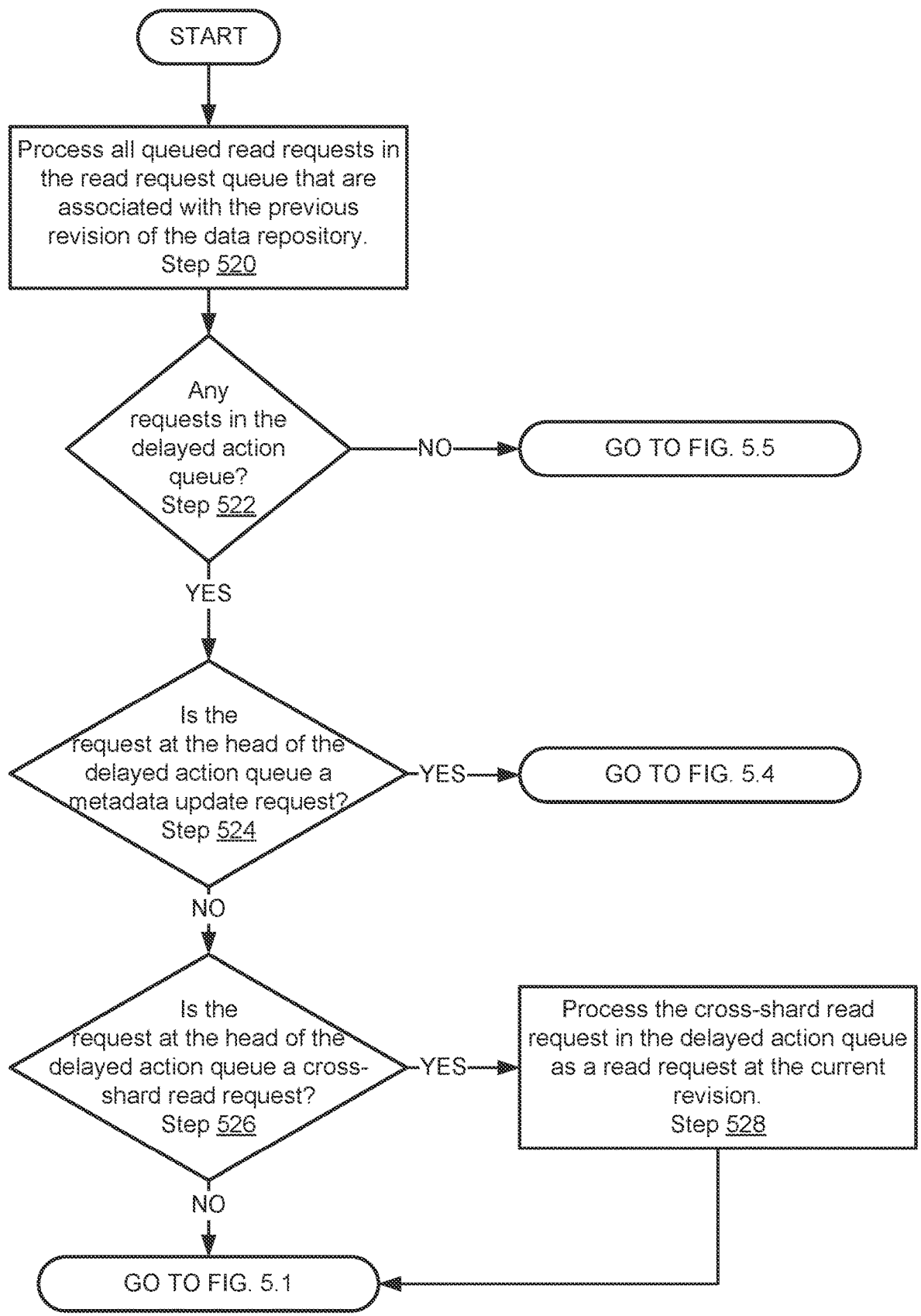
FIG. 5.3

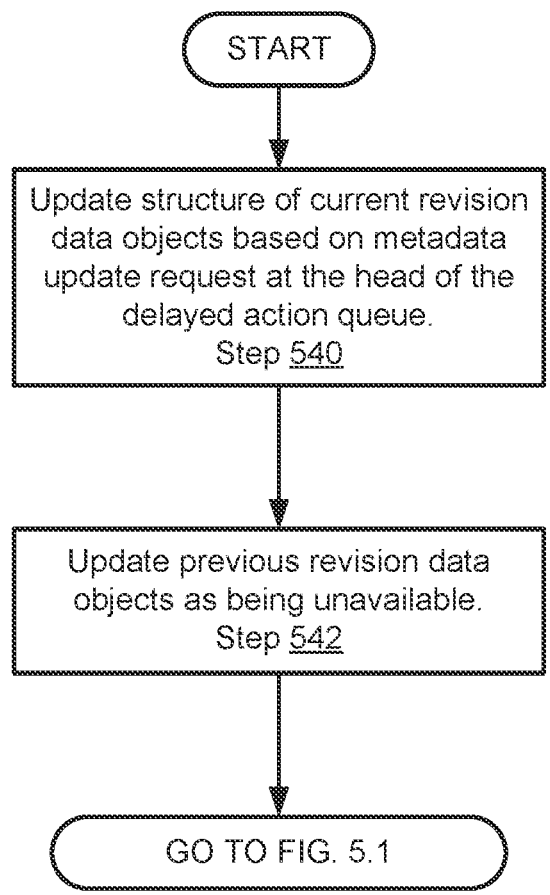
FIG. 5.4

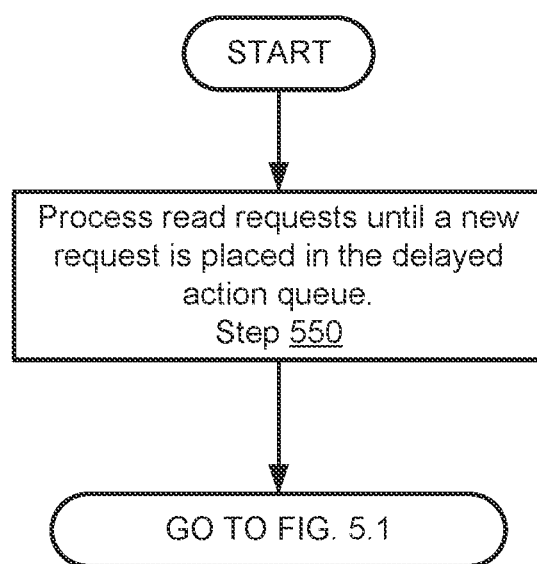
FIG. 5.5

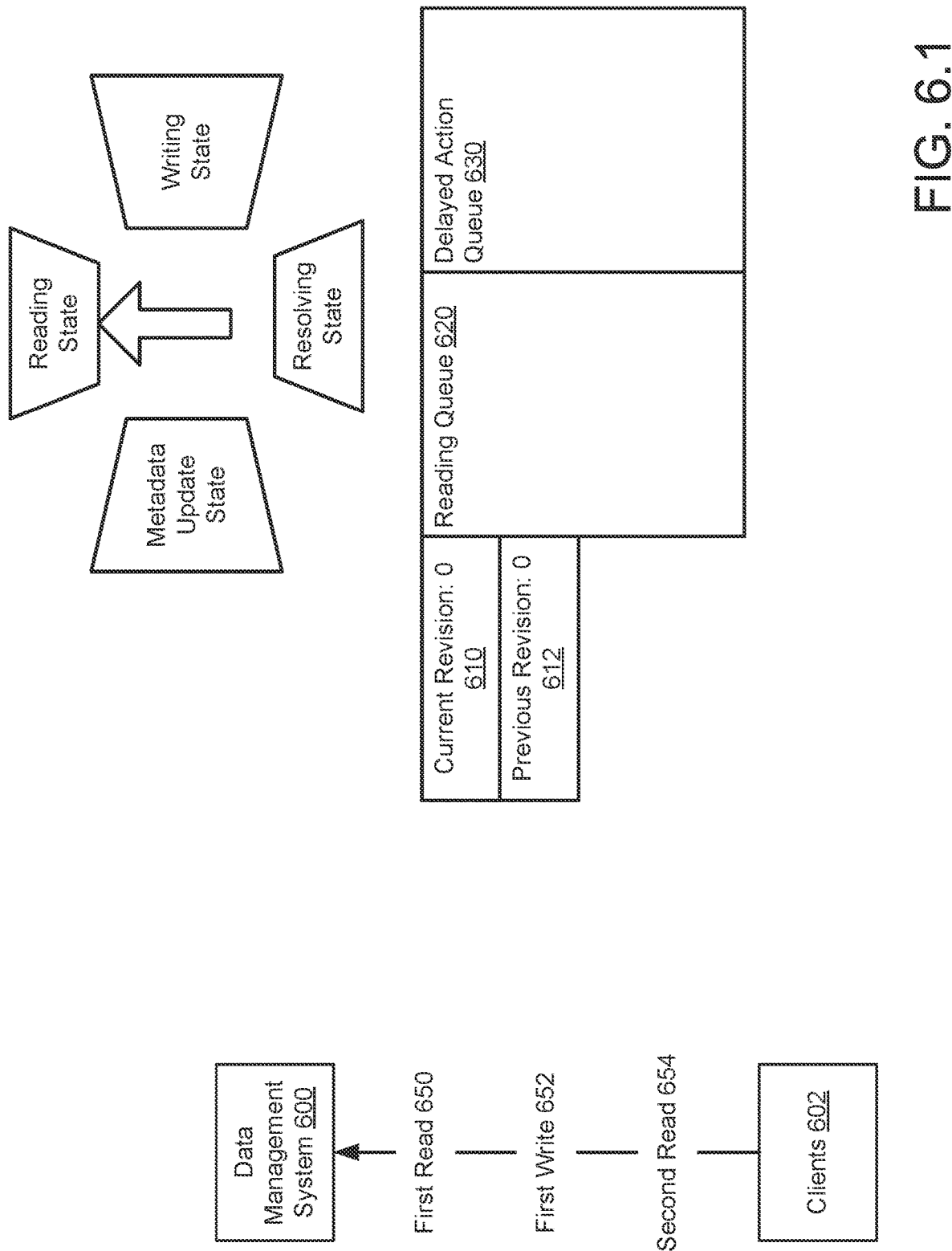
FIG. 6.1

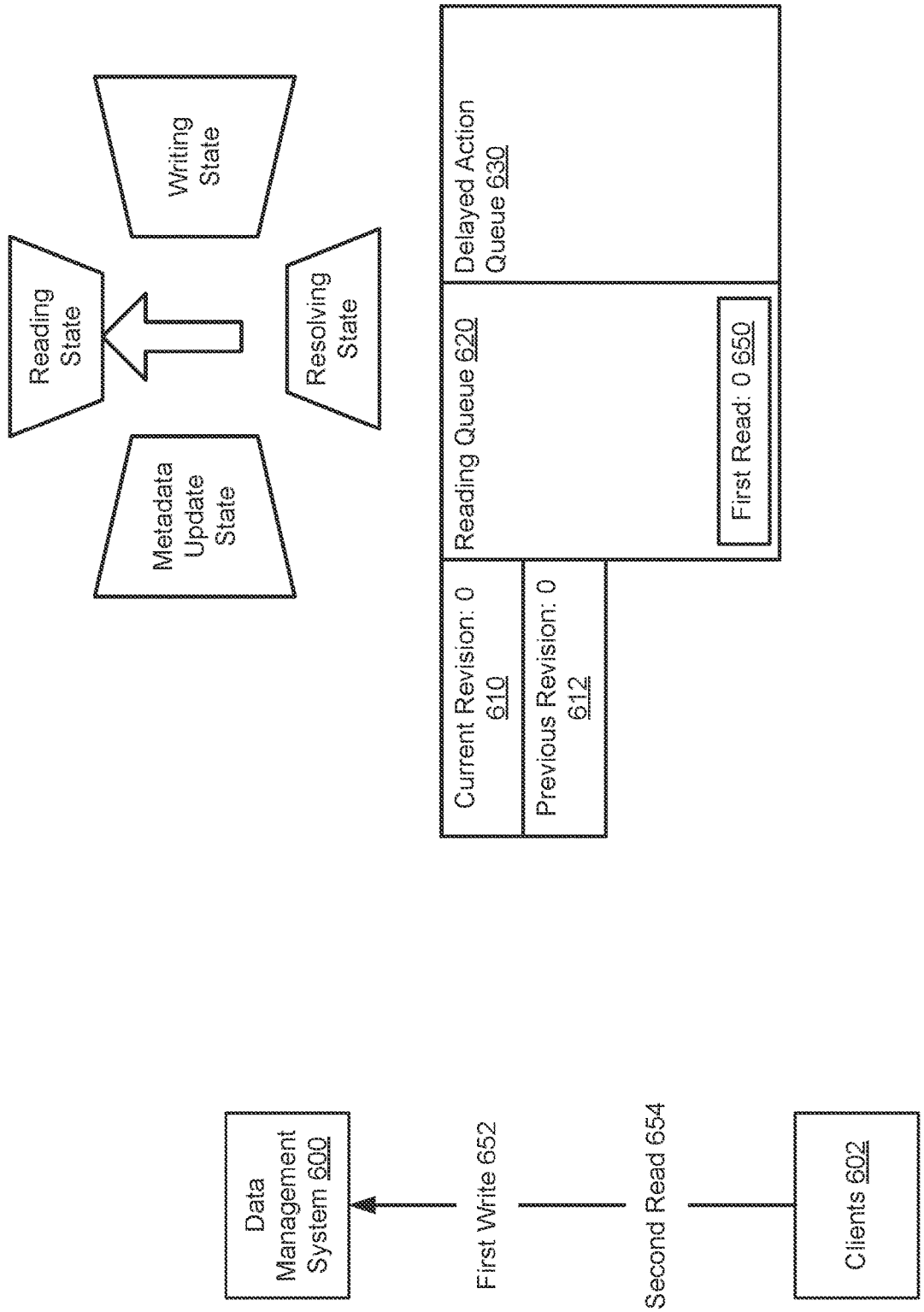
FIG. 6.2

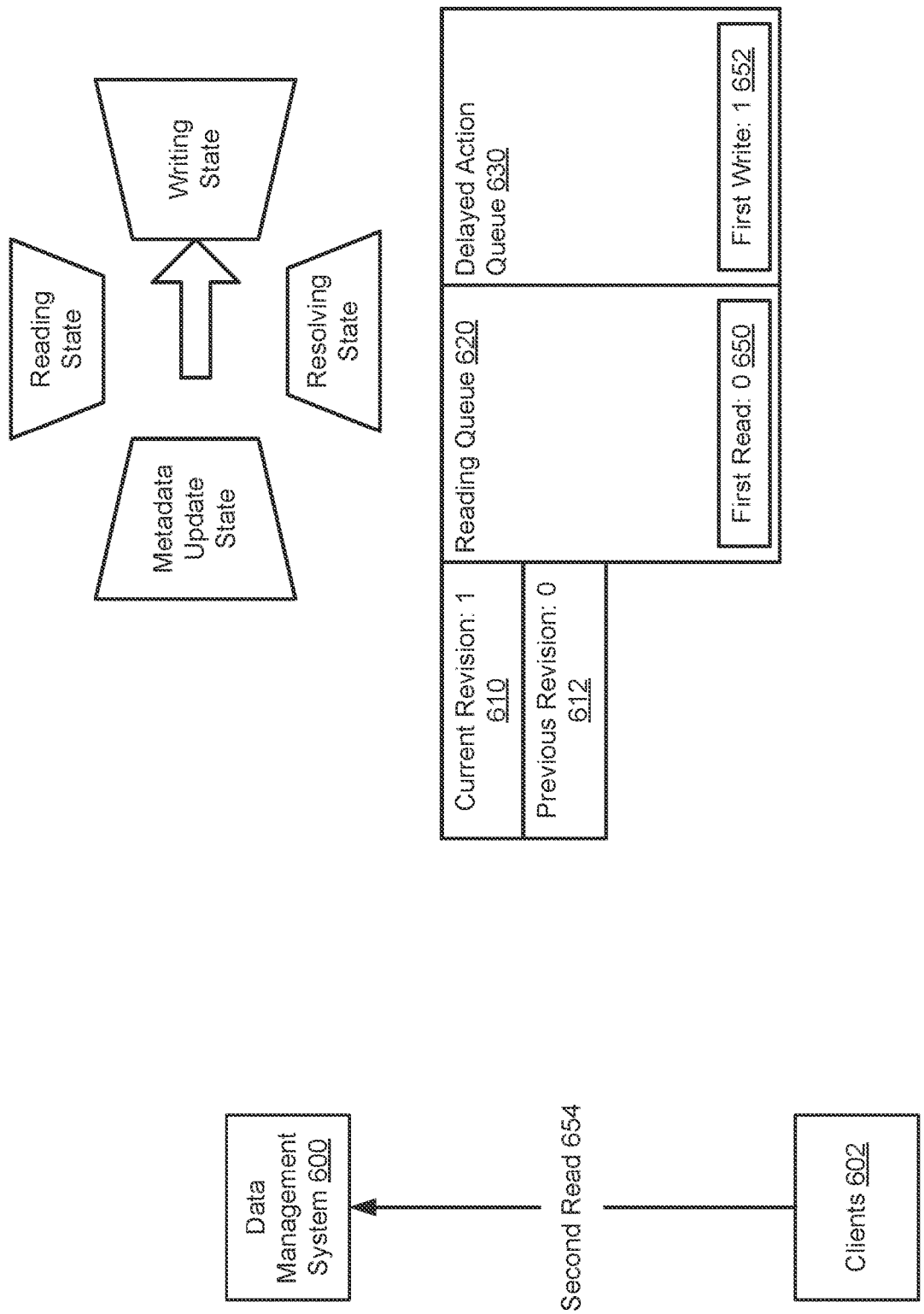
FIG. 6.3

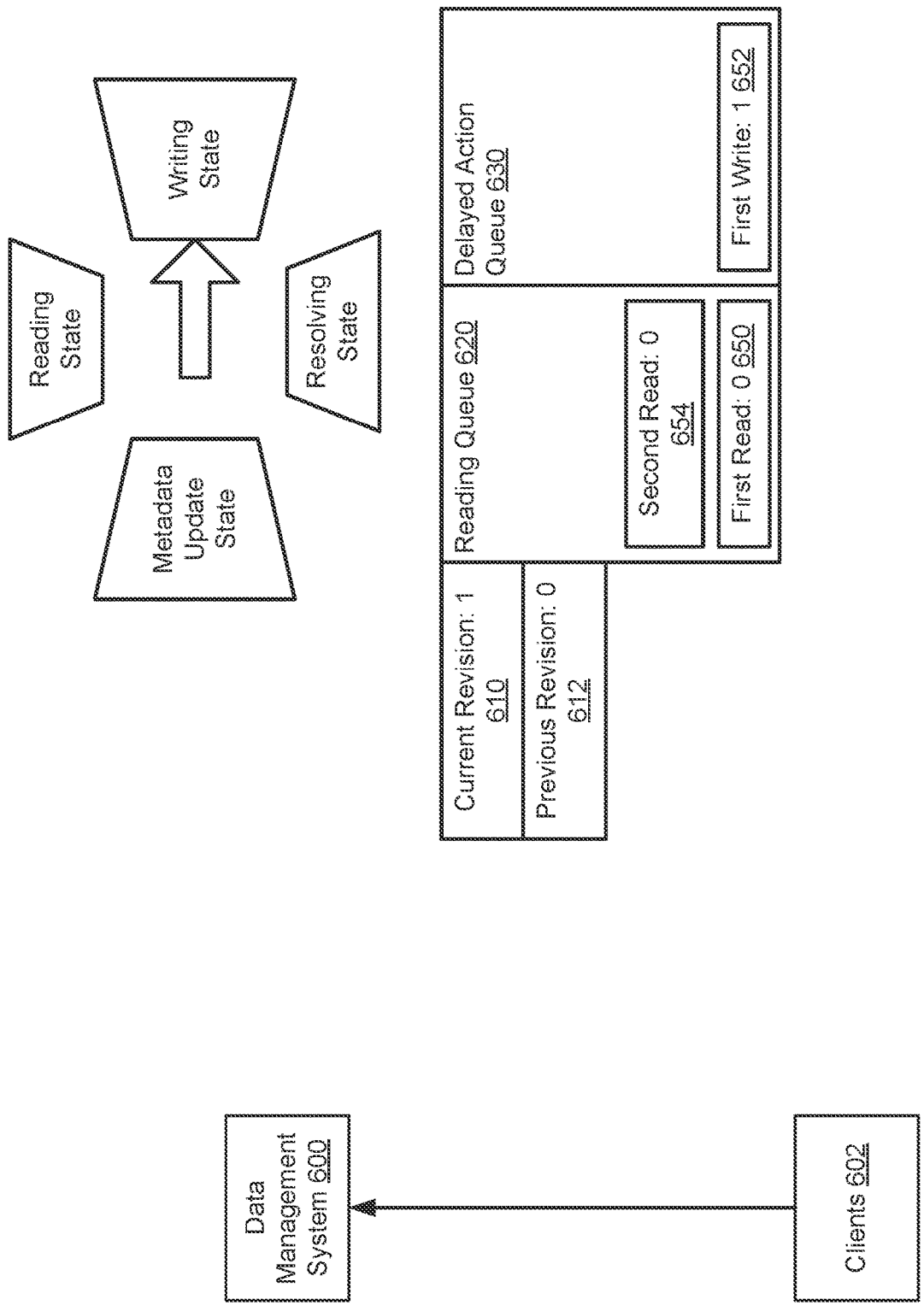
FIG. 6.4

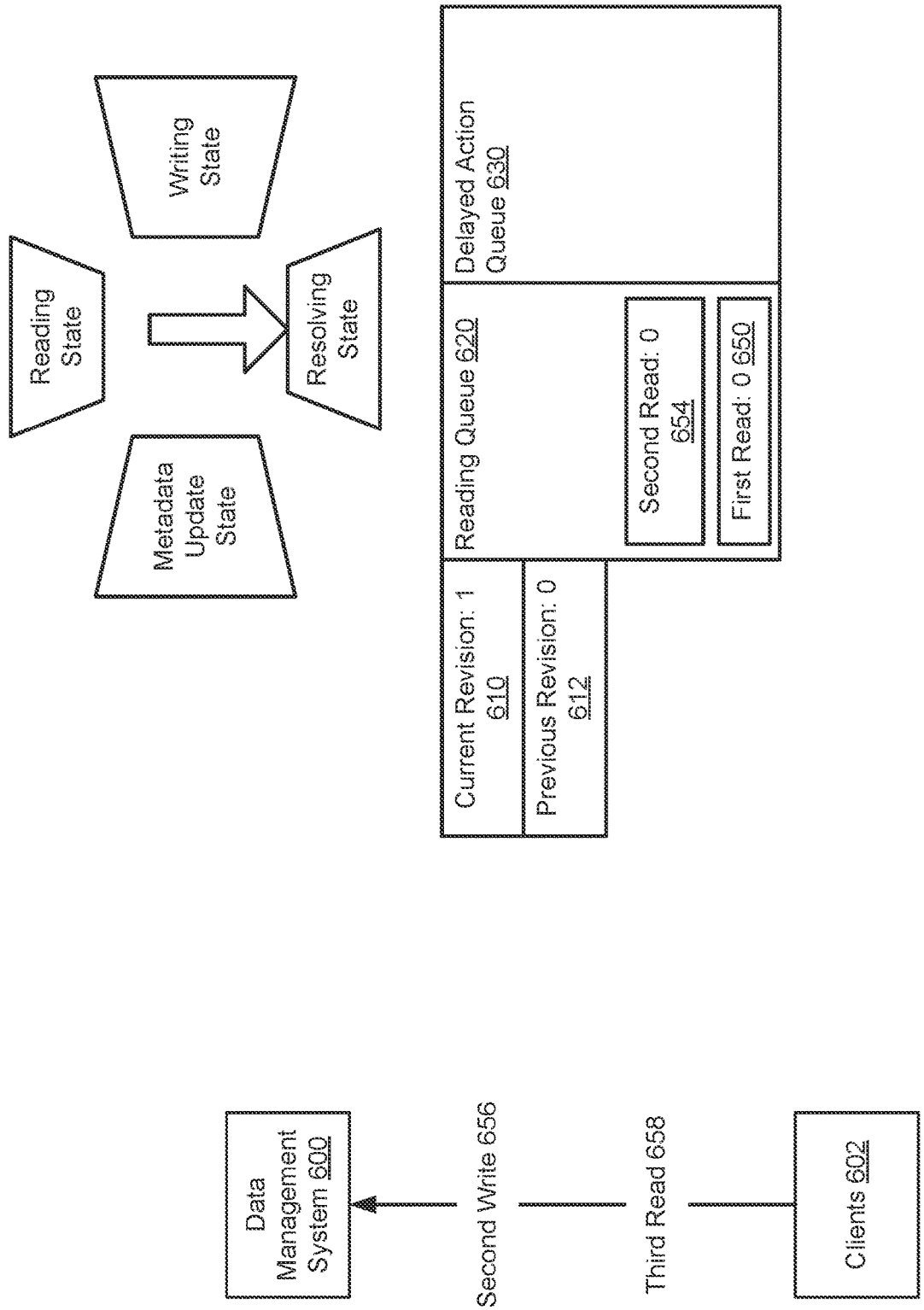
FIG. 6.5

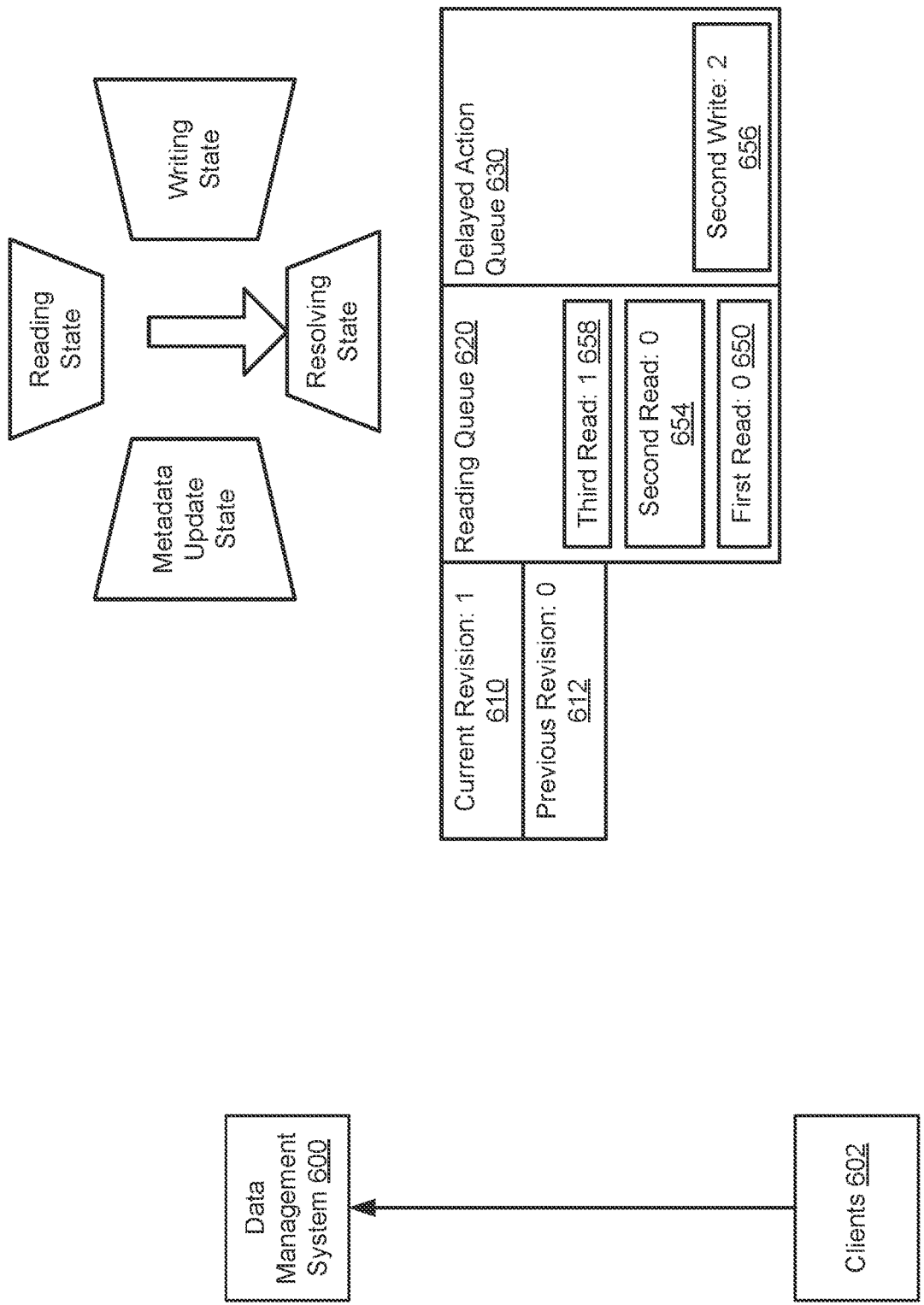
FIG. 6.6

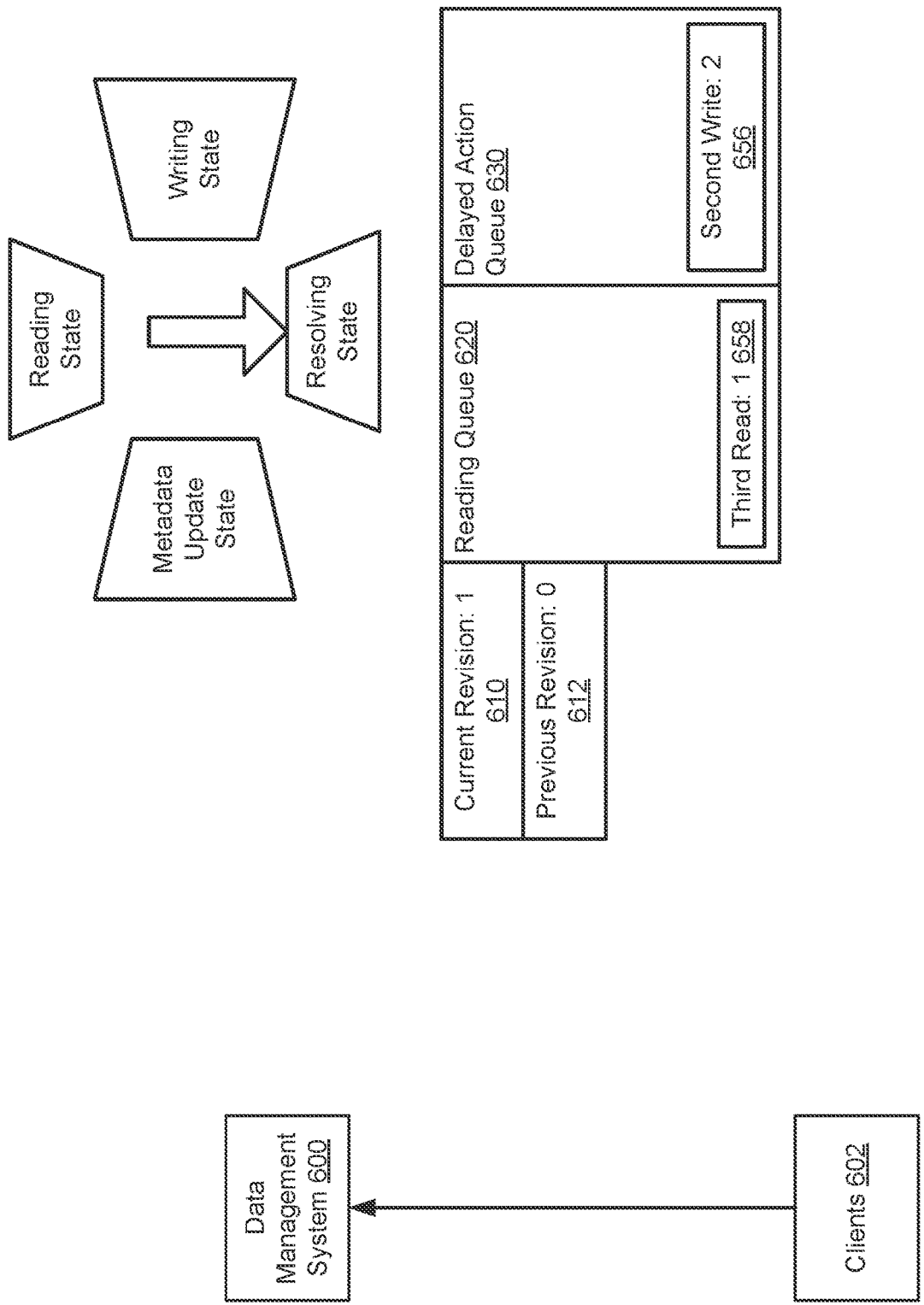
FIG. 6.7

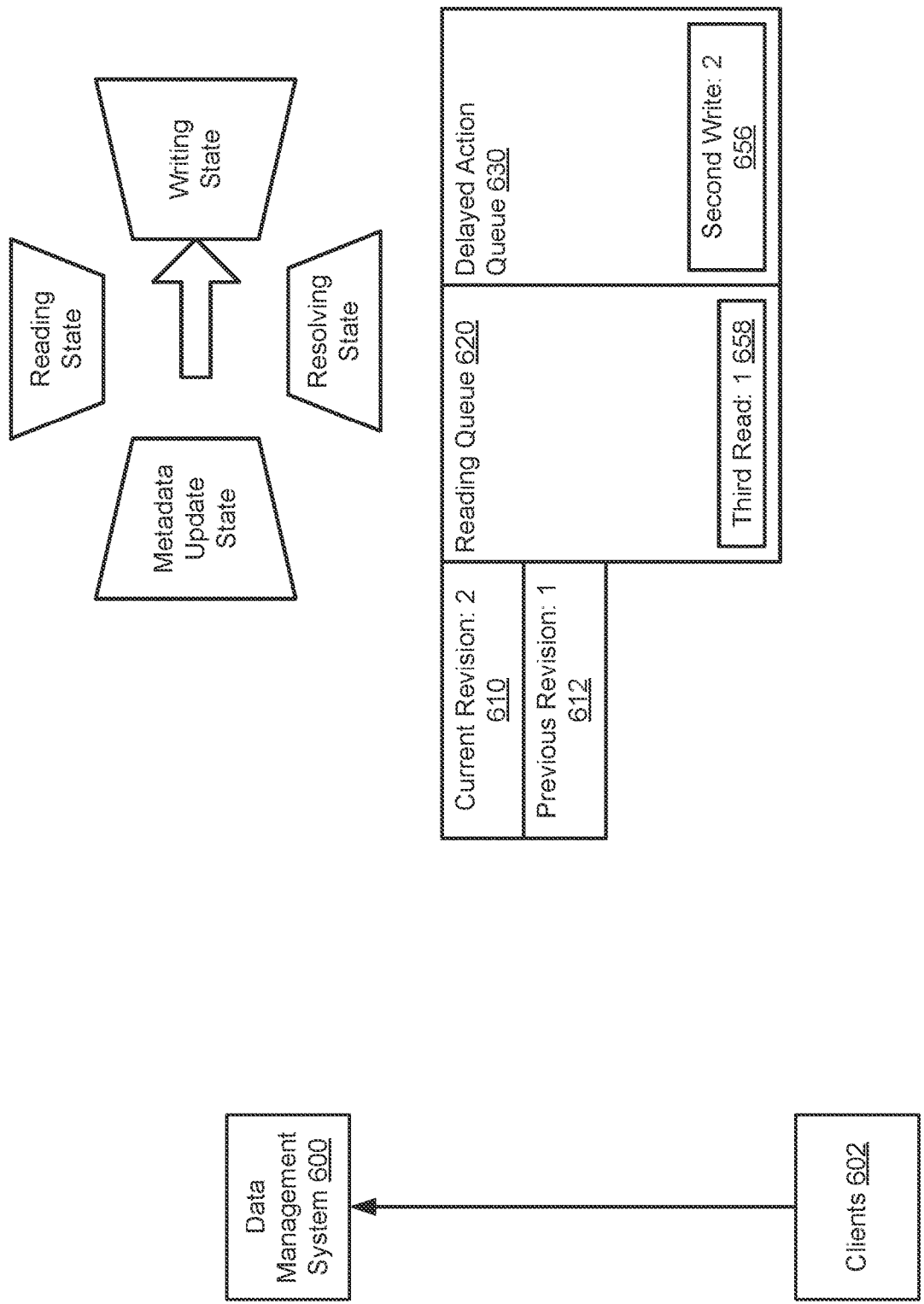
FIG. 6.8

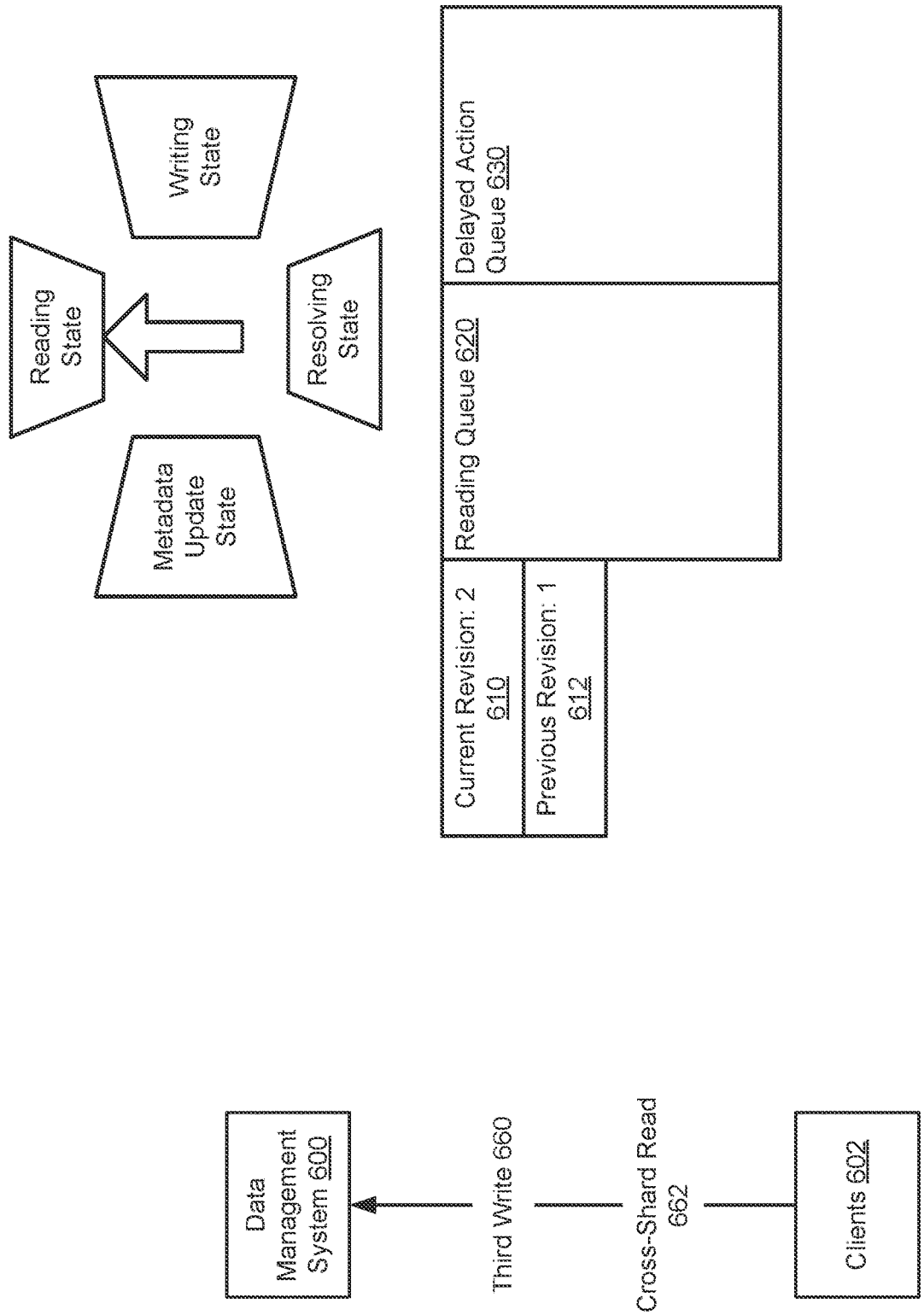
FIG. 6.9

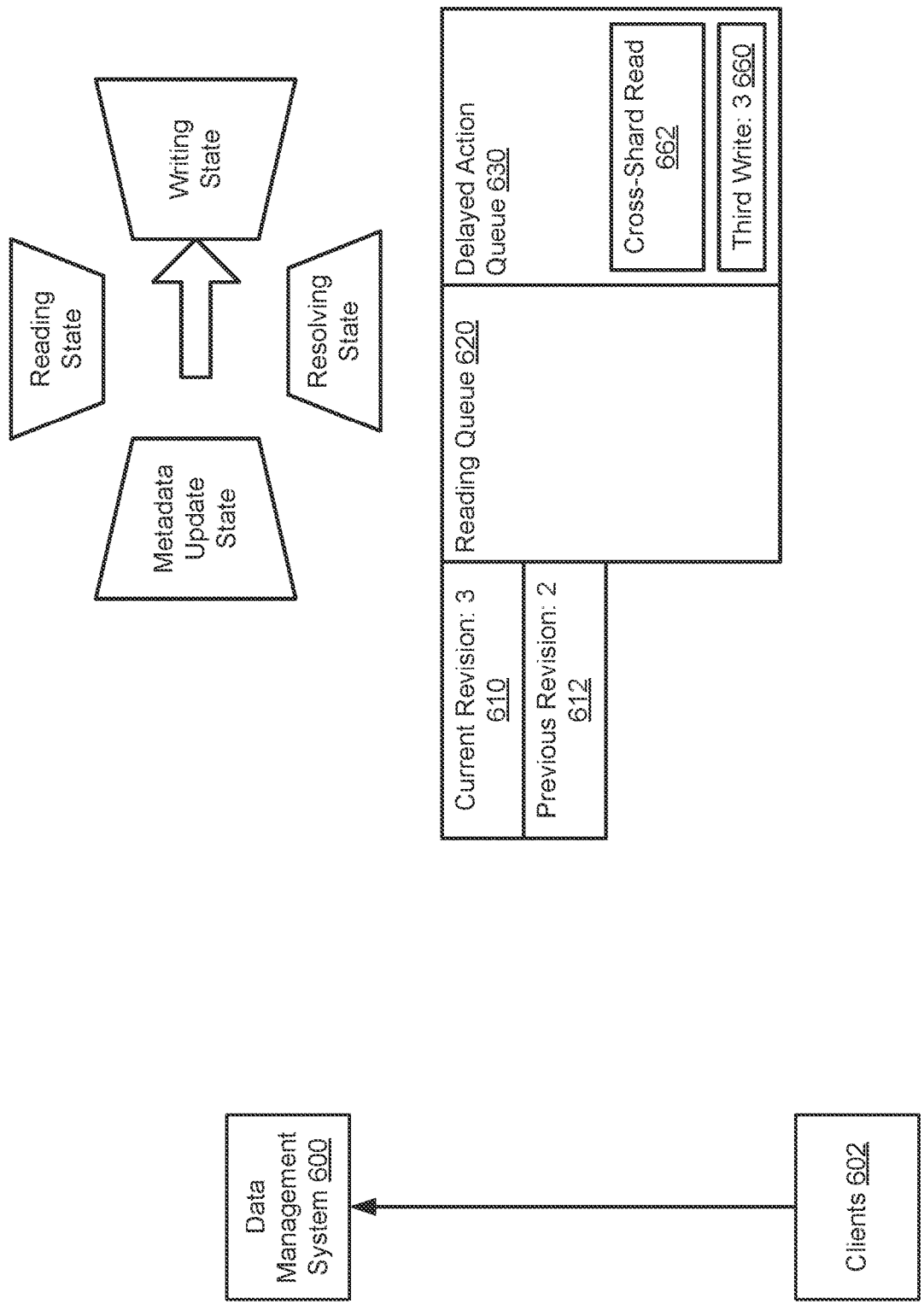
FIG. 6.10

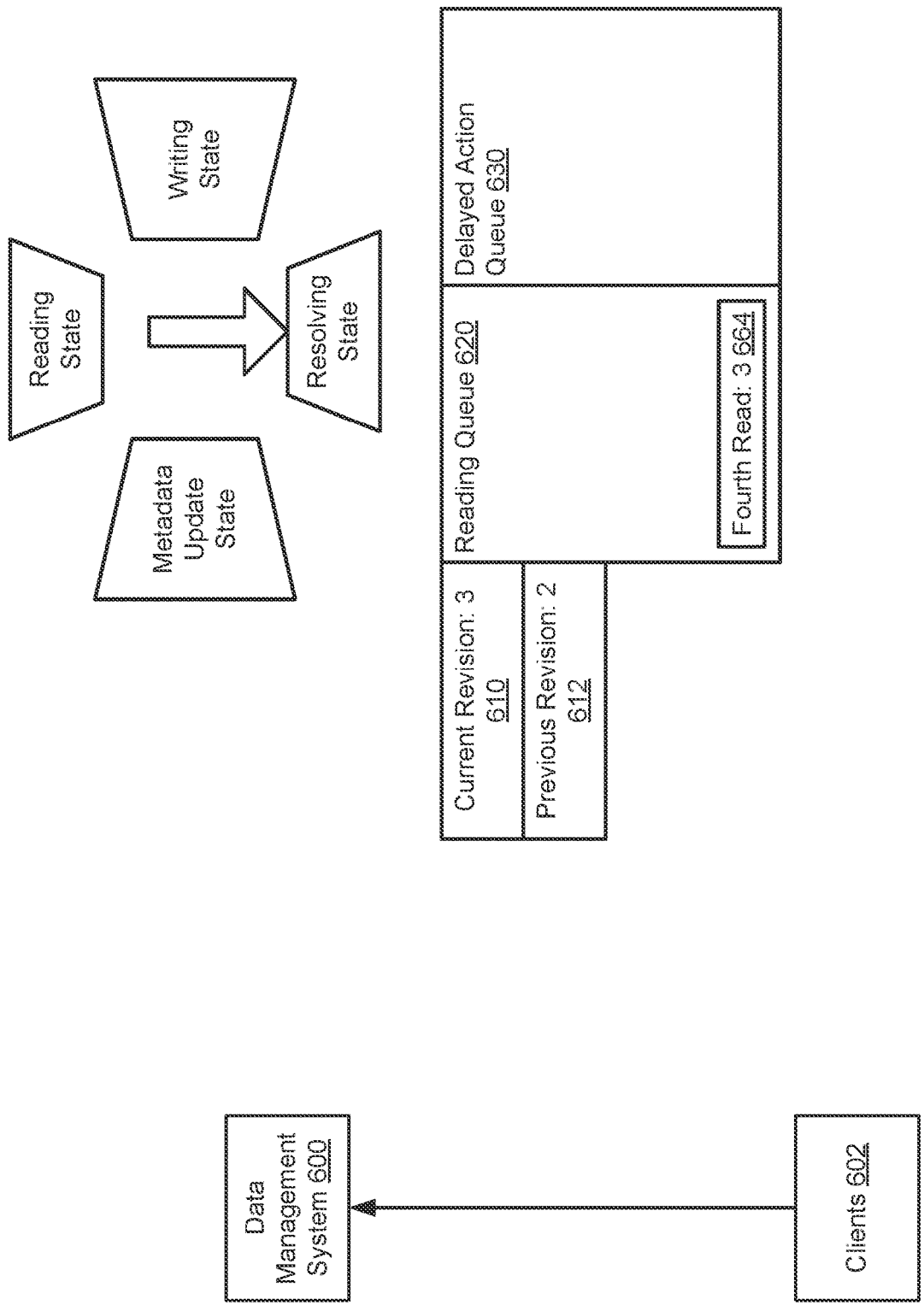
FIG. 6.11

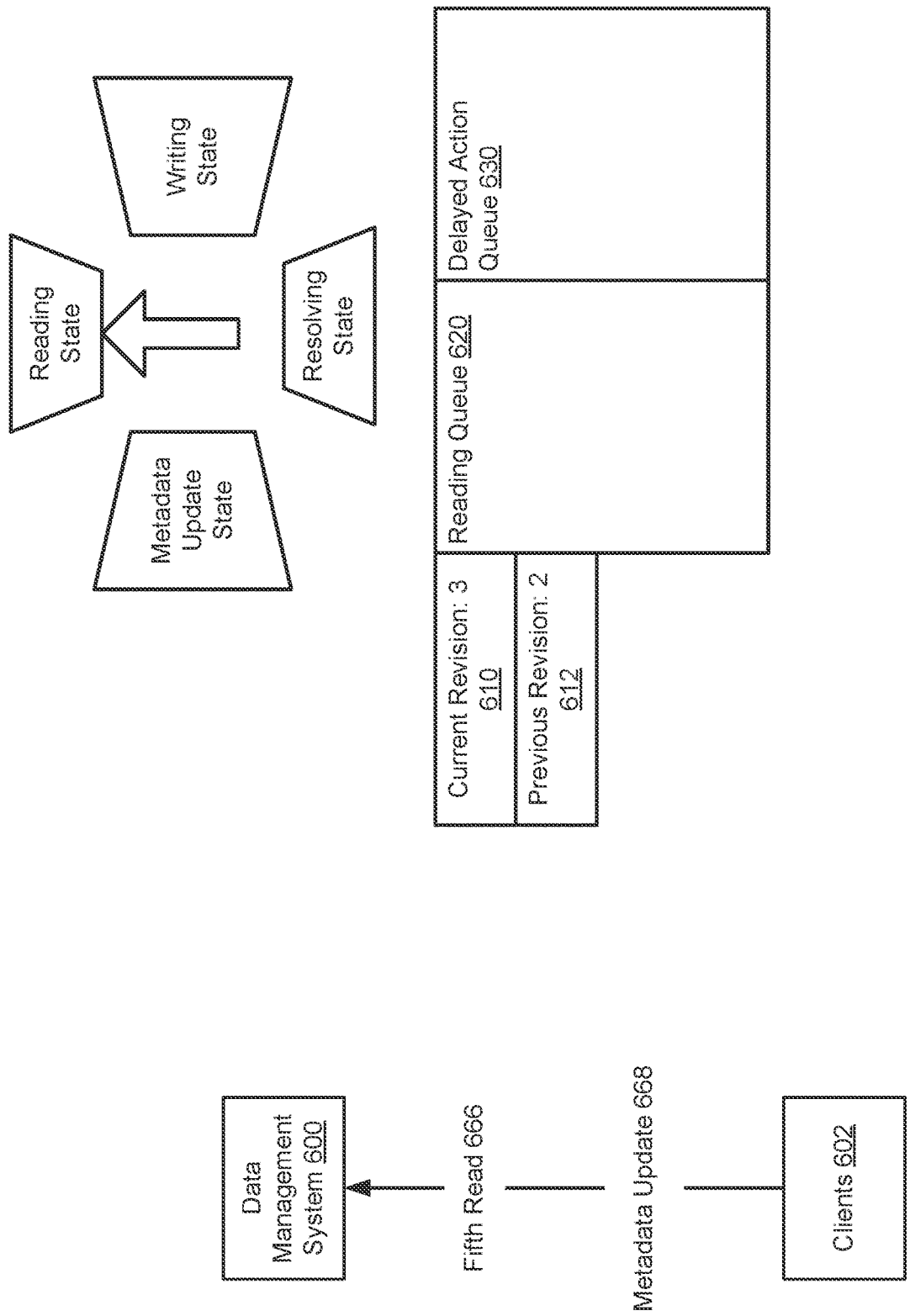
FIG. 6.12

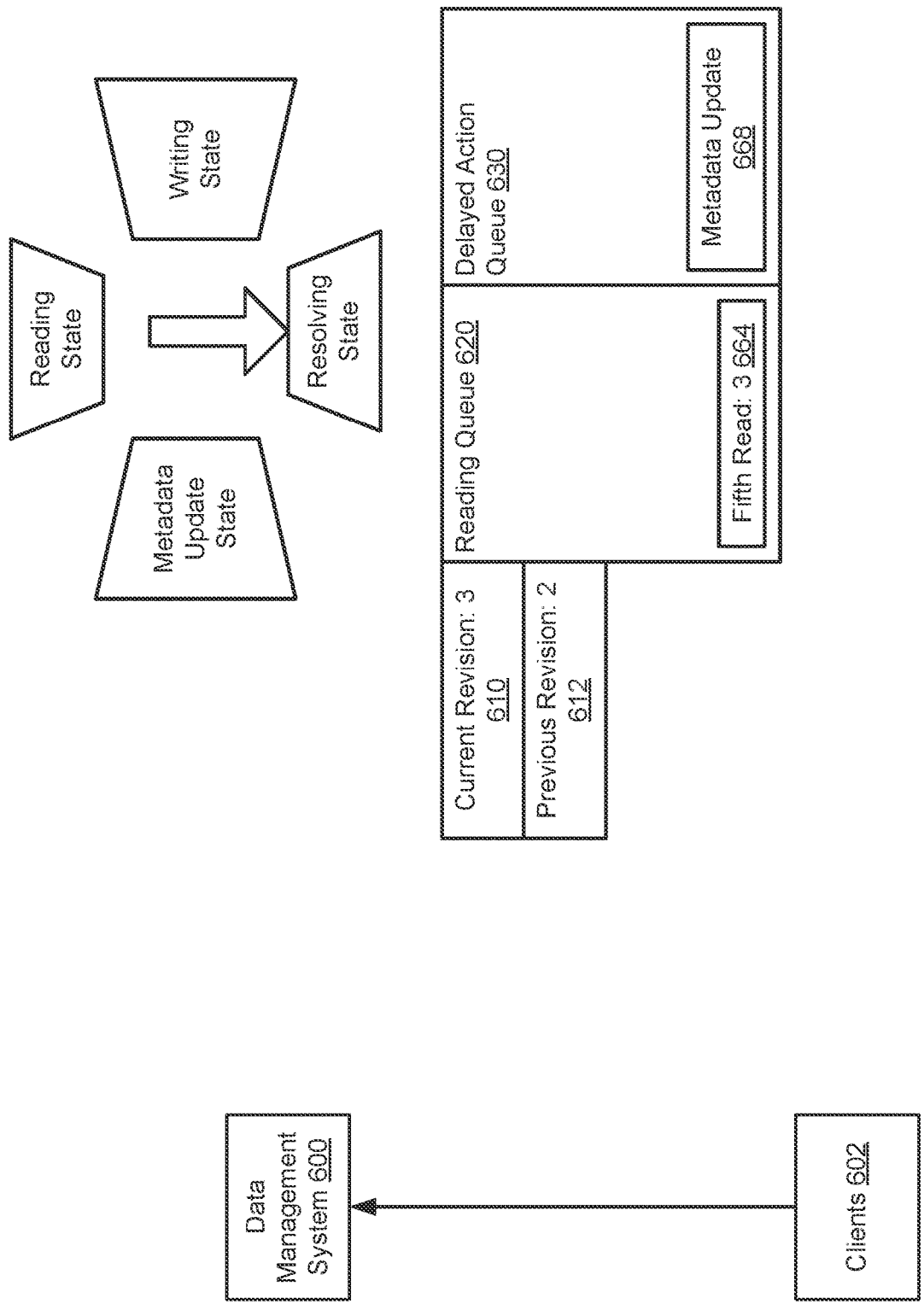
FIG. 6.13

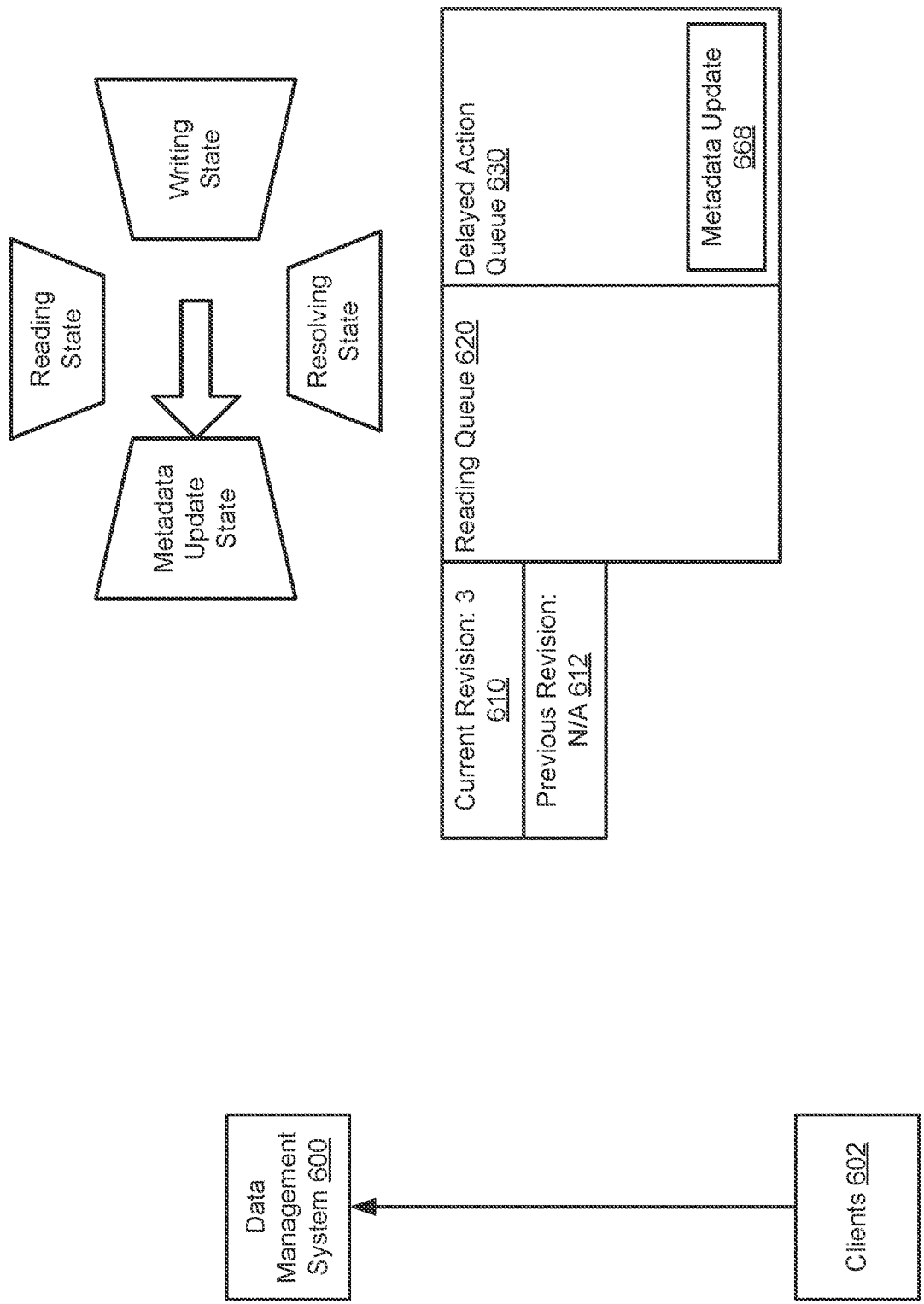
FIG. 6.14 under US 11,816,088 B2

METHOD AND SYSTEM FOR MANAGING CROSS DATA SOURCE DATA ACCESS REQUESTS

BACKGROUND

Distributed systems process data to provide desired functionality to users of the distributed system. The data may include any type and quantity of data. Processing the data consumes computing resources. Computing devices may have a limited quantity of computing resources such as processing cycles, memory capacity, and storage capacity.

SUMMARY

In one aspect, a node of a data management system that manages sharded distributed storage of high accessibility data across nodes of the data management system in accordance e with one or more embodiments of the invention includes storage that stores a portion of the high accessibility data corresponding to a shard that is divided into revisions. The portion of the high accessibility data is managed based on an activity state model including a writing state, a resolving state, a metadata update state, and a reading state. The node further includes a repository manager that obtains a cross-shard read request for the high accessibility data; makes a determination that the portion of the high accessibility data is not in the reading state; in response to the determination, adds the cross-shard read request to a delayed action queue at the revision of a last delayed action in the delayed action queue; and after processing the last delayed action in the delayed action queue: transitions the cross-shard read request to a resolving state; and while in the resolving state: converts the cross-shard read request to a read request; and processes the read request.

In one aspect, a method for managing sharded distributed storage of high accessibility data across nodes of a data management system in accordance with one or more embodiments of the invention includes obtaining, by a node of the nodes, a cross-shard read request for the high accessibility data. The node stores a portion of the high accessibility data corresponding to a shard that is divided into revisions. The portion of the high accessibility data is managed based on an activity state model including a writing state, a resolving state, a metadata update state, and a reading state. The method further includes making a determination that the portion of the high accessibility data is not in the reading state; in response to the determination, adding the cross-shard read request to a delayed action queue at the revision of a last delayed action in the delayed action queue; and after processing the last delayed action in the delayed action queue: transitioning the cross-shard read request to a resolving state; and while in the resolving state: converting the cross-shard read request to a read request; and processing the read request.

In one aspect, a non-transitory computer readable medium in accordance with one or more embodiments of the invention includes computer readable program code, which when executed by a computer processor enables the computer processor to perform a method for managing sharded distributed storage of high accessibility data across nodes of a data management system. The method includes obtaining, by a node of the nodes, a cross-shard read request for the high accessibility data. The node stores a portion of the high accessibility data corresponding to a shard that is divided into revisions. The portion of the high accessibility data is managed based on an activity state model including a writing state, a resolving state, a metadata update state, and a reading state. The method further includes making a determination that the portion of the high accessibility data is not in the reading state; in response to the determination, adding the cross-shard read request to a delayed action queue at the revision of a last delayed action in the delayed action queue; and after processing the last delayed action in the delayed action queue: transitioning the cross-shard read request to a resolving state; and while in the resolving state: converting the cross-shard read request to a read request; and processing the read request.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments of the invention.

FIG. 1.2 shows a diagram of an example node in accordance with one or more embodiments of the invention.

FIG. 1.3 shows a diagram of an example data repository in accordance with one or more embodiments of the invention.

FIG. 1.4 shows a diagram of an example derived object in accordance with one or more embodiments of the invention.

FIG. 1.5 shows a diagram of an example cross-shard reference in accordance with one or more embodiments of the invention.

FIG. 1.6 shows a diagram of an example global data map in accordance with one or more embodiments of the invention.

FIG. 1.7 shows a diagram of data repository management data in accordance with one or more embodiments of the invention.

FIG. 1.8 shows a diagram of a read queue in accordance with one or more embodiments of the invention.

FIG. 1.9 shows a diagram of a delayed action queue in accordance with one or more embodiments of the invention.

FIG. 2.1 shows a flowchart of a method of queuing a read request in accordance with one or more embodiments of the invention.

FIG. 2.2 shows a first continuation of the flowchart of FIG. 2.1.

FIG. 2.3 shows a second continuation of the flowchart of FIG. 2.1.

FIG. 5.1 shows a flowchart of a method of managing a data repository in accordance with a state model in accordance with one or more embodiments of the invention.

FIG. 5.2 shows a first continuation of the flowchart of FIG. 5.1.

FIG. 5.3 shows a second continuation of the flowchart of FIG. 5.1.

FIG. 5.4 shows a third continuation of the flowchart of FIG. 5.1.

FIG. 5.5 shows a fourth continuation of the flowchart of FIG. 5.1.

FIGS. 6.1-6.14 show diagrams of an example system over time in accordance with one or more embodiments of the invention.

DETAILED DESCRIPTION

Figure 3:
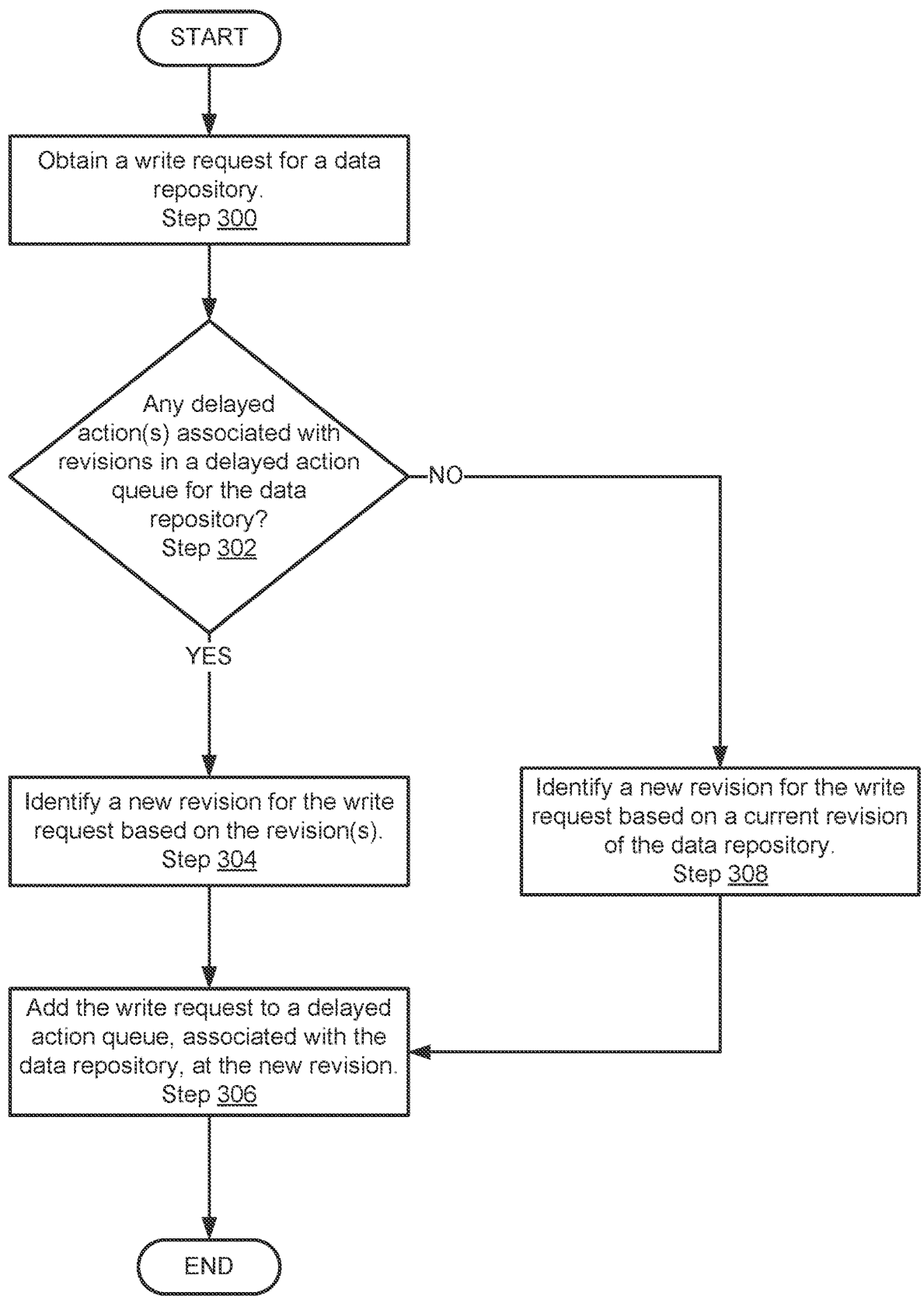
FIG. 3 shows a flowchart of a method of queuing a write request in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for managing data in a distributed system. Specifically, a system in accordance with one or more embodiments of the invention may include any number of nodes that store different portions of the data managed by the distributed systems. Each of the nodes may manage the data in accordance with a state model.

To ensure that read access to the data is highly available, the nodes may interleave performance of both reads from the data and writes to the data. To enables reads to be performed while writes are not yet complete, the system may maintain both a copy of the current revision of the data and a previous revision of the data. While the current revision of the data is in an indeterminate state due to a started but incomplete read request, the nodes may service the read requests using the previous revision of the data.

To enable reads that implicate data from across multiple nodes that may store data at different revisions to be serviced, the nodes may implement a special procedure for handling such read requests. Specifically, the nodes may specifically order the processing of such a read immediately following a predetermined write to the data. Consequently, when the read is processed, the revision of the data will be known by virtue of the immediately preceding write request. Accordingly, when such read and write requests are distributed across any number of nodes for processing, each of the nodes may return data associated with a predetermined revision of the data regardless of the revision of the data of the node when the read and write requests are received by each respective node.

By doing so, embodiments of the invention may provide data management services that are more responsive to users. Consequently, a user experience may be improved more quickly servicing read requests. Accordingly, a cognitive burden on users may be reduced by reducing the need for the users to determine whether reads are being quickly processed or are delayed (e.g., whether the user is being presented with stale data that has not been updated because of a still-pending read request).

FIG. 1.1 shows a data management system (100) in accordance with one or more embodiments of the invention. The data management system (100) may provide computer implemented services to clients (108). The computer implemented services may include, for example, data storage, data processing, and/or other types of computer implemented services. When providing the computer implemented services, the data management system (100) may obtain data for storage, generate new data based on obtained data, and provide previously obtained and/or generated data.

To provide computer implemented services to the clients (108), the data management system (100) may include any number of nodes (e.g., 104, 106). Each of the nodes (102) may provide all, or a portion, of the functionality of the data management system (100). For example, the nodes (102) of the data management system (100) may form a distributed system that provides the functionality of the data management system (100).

Each of the nodes (102) may store a portion of data managed by the data management system (100). When a change is made to any portion of the data managed by the data management system (100), the change may impact other data managed by the data management system (100).

For example, when a change to data is obtained by one of the nodes (e.g., 104), another node (e.g., 106) that stores a duplicative copy of the data may need to be updated. In another example, when a change to data is obtained by one of the nodes (e.g., 104), other data that depends on the contents of the changed data may need to be updated based on the change (stored locally or remotely in another node (e.g., 106)).

Making these updates to the data managed by the data management system (100) may be time consuming and/or computationally expensive. Consequently, propagating these changes throughout the system may impact a user experience if data read requests or other types of client-initiated actions are delayed due to the complexity of changing the data managed by the data management system (100).

In general, embodiments of the invention provide systems, methods, and devices for providing desired quality of user experience when interacting with data managed by the data management system (100). The desired quality of user experience may be, for example, a responsiveness of the data management system (100) with respect to client-initiated actions (and/or other types of actions initiated by other entities).

To provide the desired quality of user experience, the data managed by the data management system (100) may be distributed across the nodes (102). For example, the data may be stored in a database that is sharded across the nodes (102). Consequently, each of the nodes may only store a portion of the data managed by the data management system (100).

In one or more embodiments of the invention, the data is sharded by row across the nodes. The partitions may be set in a manner that makes it more likely that a node that receives a data change request (e.g., a write request) will service the data change request by virtue of storing all, or a portion, of the impacted data locally. The partitions may define the various portions of data hosted by each of the nodes (102). The data may be sharded in other manners (e.g., by column) without departing from the invention.

To manage data access requests (e.g., write requests, read requests, metadata change requests, etc.), the data management system (100) may operate in accordance with a state model. The state model may include four allowed states including: (i) a writing state, (ii) a resolving state, (iii) a metadata update state, and (iv) a reading state. Each of these states may limit the types of data access requests that may be serviced. For example, read requests may be serviced during the writing state, resolving state, and reading state. In contrast, write requests may only be serviced during the writing state. In another example, metadata update requests may only be serviced during the metadata update state. These limitations may be enforced based on limitations regarding the availability of data stored in the data management system (100) and the allowed progressions through these states.

When a data access requests is received and is not able to be immediately services based on, for example, the current state or other requests being serviced during the current state, the data access requests may be queued for future processing. To ensure that these queued requests may be serviced in the future, the data management system (100) may ensure, by virtue of the manner in which states a progressed, that the data necessary to service the queued requests is available in the future.

For example, the system may store both a copy of the current revision of the data and a copy of the previous revision of the data managed by the data management system (100). Consequently, if a data access request requires the availability of the previous revision of the data for it to be serviced, then the will be available at the time the queued data access request is serviced. As the data management system (100) progresses through the state model, the data management system (100) may require that all queued requests which require access to the previous revision be serviced before a new revision to be made (which would result in the destruction of the previous revision, as will be discussed in greater detail below).

By utilizing the state model and data store discussed above, the data management system (100) may provide an improved quality of user experience by servicing read requests while also processing write requests. Consequently, the perceived responsiveness of the system from the perspective of a user may be improved when compared to limiting servicing of read requests until write requests a processed. Because read requests may be processed in parallel with write requests, the data management system (100) may efficiently marshal limited computing resources to provide computer implemented services.

The components of the system illustrated in FIG. 1.1 may be operably connected to each other and/or other entities (not shown) via any combination of wired and/or wireless networks. Each component of the system illustrated in FIG. 1.1 is discussed below.

The clients (108) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the clients (108) described in this application and/or all, or portion, of the methods illustrated in FIGS. 2.1-5.5. The clients (108) may be implemented using other types of computing devices without departing from the invention. For additional details regarding computing devices, refer to FIG. 7.

The clients (108) may be implemented using logical devices without departing from the invention. For example, the clients (108) may be implemented using any number of computing devices that host virtual machines (which, in turn, host any type and quantity of applications) that utilize the computing resources of the computing devices to provide the functionality of the clients (108).

In one or more embodiments of the invention, the clients (108) utilize computer implemented services provided by the data management system (100). For example, the clients (108) may store data in the data management system (100), retrieve data from the data management system (100), instruct the data management system (100) to derive new data from data already stored in the data management system (100) and/or other locations, and/or obtain other types of computer implemented services from the data management system (100).

The nodes (102) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the nodes (102) described in this application and/or all, or portion, of the methods illustrated in FIGS. 2.1-5.4. The nodes (102) may be implemented using other types of computing devices without departing from the invention. For additional details regarding computing devices, refer to FIG. 7.

The nodes (102) may be implemented using logical devices without departing from the invention. For example, the nodes (102) may be implemented using any number of computing devices that host virtual machines (which, in turn, host any type and quantity of applications) that utilize the computing resources of the computing devices to provide the functionality of the nodes (102).

In one or more embodiments of the invention, the nodes (102) provide data management services for a portion of the data of the data management system (100) stored in the nodes. The data management services may include: (i) storing of data in computing resources of the respective node, (ii) providing copies of stored data from computing resources of the respective node, and/or (iii) generating/storing new data based on obtained data in computing resources of the respective node. Additionally, each of the nodes may cooperate to ensure that data access requests received by one of the nodes that impacts other nodes is appropriately services by the nodes. For example, the nodes (102) may implement a message passing system, publish-scribe system, or any other technique to manage the operation of a distributed system.

To provide data management services, each of the nodes (102) may include functionality to service data access requests. A data access requests may be a request to store, provide, and/or generate data. Servicing a data access requests may generate a data access requests result in the form of, for example, stored data, changes in stored data, and/or data to be provided to a client or other entity. A node may provide other data management service functionality without departing from the invention.

In one or more embodiments of the invention, each node includes functionality to service data access requests that reference data stored locally (e.g., in the node that obtained the data access requests) and remotely (e.g., in other nodes). For example, node A (104) may service a data access requests that requests generation of new data based on data stored in node B (104) and data stored locally. To do so, a global reference may be utilized.

In one or more embodiments of the invention, the data managed by the data management system (100) may have a time basis. That is, events (e.g., receiving a data access request) that with respect to any node may impact the state of the data across all of the nodes (102). To keep track of the time basis, data revisions may be used. A data revision may be the state of the data managed by the data management system (100) after a particular event has occurred. As events occur, the current revision may be updated.

For example, consider a scenario where node A (104) receives a write request that impacts its local data. When the write request is serviced, it may change the data stored by the entire data management system (100). Consequently, even though no changes to the data stored by node N (106) were made by virtue of the write request, the revision of Node N's (106) data is updated when the write request is serviced. Accordingly, the state of all data managed by the data management system (100) may have a consistent basis with respect to the temporal occurrence of events across the system.

While the system of FIG. 1.1 has been described and illustrated as including a limited number of components for the sake of brevity, a system in accordance with embodiments of the invention may include additional, fewer, and/or different components than those illustrated in FIG. 1.1 without departing from the invention. For additional details regarding the nodes (102), refer to FIG. 1.2.

Turning to FIG. 1.2, FIG. 1.2 shows a diagram of an example node (110) in accordance with one or more embodiments of the invention. Any of the nodes of FIG. 1.1 may be similar to the example node (110).

The example node (110) may cooperatively provide data management services with other nodes of the data management system (100, FIG. 1.1). To provide this functionality, the example node (110) may include a data repository manager (112), applications (114), and storage (116). Each component of the example node (110) is discussed below.

The data repository manager (112) may service data access requests received from, for example, clients (e.g., 108, FIG. 1.1). To do so, the data repository manager (112) may provide data access request service functionality in conjunction with other data repository managers hosted by other nodes. As discussed above, the data access request service functionality may cause data to be stored locally (e.g., in a data repository (118)) and/or remotely, provide data that is already stored (e.g., locally and/or remotely), and/or generate new data based on stored data and/or newly obtained data.

When servicing data access requests, the data repository manager (112) may utilize a global data map (120) and/or data repository management data (122) stored in the storage (116). For example, the data repository manager (112) may identify where (e.g., locally and/or remotely) particular data is stored using the global data map (120).

In one or more embodiments of the invention, the data repository manager (112) is implemented using a hardware device including circuitry. The data repository manager (112) may be implemented using, for example, a digital signal processor, a field programmable gate array, or an application specific integrated circuit. The data repository manager (112) may be implemented using other types of hardware devices without departing from the invention.

In one or more embodiments of the invention, the data repository manager (112) is implemented using a hardware device that executes computing code stored on a persistent storage that when executed by a hardware device (e.g., a processor) performs the functionality of the data repository manager (112). The hardware device may be a hardware processor including circuitry such as, for example, a central processing unit or a microcontroller. The data repository manager may be implemented using other types of hardware devices without departing from the invention.

To provide the above noted functionality of the data repository manager (112), the data repository manager (112) may perform all, or a portion, of the methods illustrated in FIGS. 2.1-5.4.

The applications (114) may provide computer implemented services to clients. The computer implemented services may include any type of service without departing from the invention. The example node (110) may host any number of applications (114).

In one or more embodiments of the invention, the applications (114) provide modeling services based on data stored in the data repository (118) and/or data stored in data repositories of other nodes. For example, the applications (114) may generate predictions based on data stored in the data repository (118).

In one or more embodiments of the invention, the applications (114) provide modeling support services. The modeling support services may provide subsets of the data in the data repository (118) that is relevant to a particular modeling task. Modeling software hosted by a client may use the subset of the data to generate a prediction or may use the subset of the data for other purposes.

In one or more embodiments of the invention, the applications (114) are implemented using computing code stored on a persistent storage that when executed by a processor performs the functionality of the applications (114). The processor may be a hardware processor including circuitry such as, for example, a central processing unit or a microcontroller. The processor may be other types of hardware devices for processing digital information without departing from the invention.

To provide the above noted functionality of the applications (114), the applications (114) may perform all, or a portion, of the methods illustrated in FIGS. 2.1-5.4.

In one or more embodiments disclosed herein, the storage (116) is implemented using physical devices that provide data storage services (e.g., storing data and providing copies of previously stored data). The devices that provide data storage services may include hardware devices and/or logical devices. For example, storage (116) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage (116) may include a memory device (e.g., a dual in line memory device) in which data is stored and from which copies of previously stored data are provided. In another example, storage (116) may include a persistent storage device (e.g., a solid-state disk drive) in which data is stored and from which copies of previously stored data is provided. In a still further example, storage (116) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (116) may also be implemented using a physical device that provides logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

In one or more embodiments of the invention, the storage (116) stores the data repository (118), global data map (120), and data repository management data (122). Each of these data structures is described below.

In one or more embodiments of the invention, the data repository (118) is implemented using one or more data structures that include a portion of the data managed by a data management system. Each node of the data management system may store a portion of the data of the data management system. In other words, the data of the data management system may span across any number of nodes. For additional details regarding the data repository (118), refer to FIG. 1.3.

In one or more embodiments of the invention, the global data map (120) is implemented using one or more data structures that include location information regarding all of the data managed by a data management system. The location information may enable the data repository manager (112) to retrieve any data from any node of the data management system. For additional details regarding global data maps, refer to FIG. 1.6.

In one or more embodiments of the invention, the data repository management data (122) is a data structure that includes information used to manage the data of the data management system. The data repository management data (122) may include, for example, state management data used to manage the state of the data repository (118), information regarding queue data access requests, and/or other types of information that may be used to manage servicing of data access requests. For additional details regarding the data repository management data (122), refer to FIGS. 1.7-1.8.

Any of the data structures described above may be implemented using, for example, tables, lists, linked lists, databases, or other types of data structures.

While the storage (116) has been illustrated and described as including a limited number of data structures that are stored in a specific format, the storage (116) may include additional, different, and/or less data from than illustrated in FIG. 1.2 without departing from the invention. Additionally, while the data structures illustrated in FIG. 1.2 are illustrated as being separate them other types of data, these data structures may be integrated into other data structures; include additional, different, and/or less data the described above; and/or may be subdivided into any number of data structures without departing from the invention. Further, while the data structures illustrated in FIG. 1.2 are shown as being stored in a storage of the example node (110), these data structures may be stored in other locations (e.g., remote), spanned across any number of computing devices, and/or shared with any number of other entities without departing from the invention.

To further clarify aspects of embodiments of the invention, diagrams of data structures in accordance with embodiments of the invention are illustrated in FIGS. 1.3-1.9. These data structures may be utilized by the example node (110) to service data access requests in accordance with a state model implemented by a data management system.

FIG. 1.3 shows a diagram of an example data repository (130) in accordance with one or more embodiments of the invention. As noted above, the example data repository (130) may store a portion of the data managed by a data management system.

The data stored in the example data repository (130) may be a multi-dimensional data set. For example, the data stored in the example data repository (130) may include any number of records that have any number of associated parameters. The records may be stored, for example, in rows while the parameters may be associated with respective columns. Each record may include any number of parameters.

The example data repository (130) may include current revision primary objects (132), previous revision primary objects (134), current revision derived objects (136), and previous revision derived objects (138). The current revision primary objects (132) may be independent objects. That is, the content of current revision primary objects (132) may not depend on the content of any other object. For example, when a client requests to store data in the example data repository (130), the data may be stored using one or more current revision primary objects (132).

The current revision derived objects (136) may be data structures having contents that are based on the content of one or more current revision primary objects (132) and/or other current revision derived objects (136). The derived objects may include information necessary to obtain the content of the derived object (e.g., a formula). When the content of the derived object is computed, it may be referred to as a derived object instance.

To further clarify derived objects, a diagram of an example current revision derived object (140) in accordance with one or more embodiments of the invention is shown in FIG. 1.4. As noted above, derived objects may include information necessary to obtain the content of the derived object.

The current revision objects may be associated with a current revision of the data stored in the example data repository (130). In contrast, the previous revision objects may be associated with a past version of the data (e.g., prior to a change in content of the data stored in the data repository).

As noted above, the example data repository (130) may also include previous revision primary objects (134) and previous revision derived objects (138). When a new revision of the data managed by a data management system is generated, copies of the current revision objects may be saved as these previous revisions so that they remain accessible after the revision is completed.

For example, consider a scenario where a current revision primary object is modified based on a write by a client. This data access request may modify the data managed by the data management system thereby creating a new revision. In such a scenario, prior to completing the modification of the current revision primary object, the data of the current revision primary object is stored a previous revision primary object. By doing so, both the current revision and previous revision of the data managed by the data management system is generally maintained by the system until all data access requests which may require availability of the previous revision objects are serviced.

In one or more embodiments of the invention, the previous revision objects may only include references to current revision objects. For example, in some scenarios the current revision and previous revision objects may have the same value. In such a scenario, a symbol or other type of indicator may be used to indicate that the previous revision object data should be obtained from a corresponding current revision derived object. Consequently, duplicative storage of data may be avoided thereby improving the efficiency of storage resources. The indicator may be, for example, the lack of a previous revision object. When a previous revision object is not present, then the system may automatically infer that the desired previous revision object data can be obtained from the corresponding current revision object.

In one or more embodiments of the invention, one or more of the previous revision objects may store (or be referenced by) a symbol (e.g., a predetermined bit sequence) indicating that no previous revision object is available. For example, in some scenarios, no previous revision object data may be present because it has never been generated by virtue of a modification of the data repository. In such a scenario, a specific indicator may be stored as the previous revision object or an identifier of the previous revision object may be referenced to indicate to the system that no previous revision object data is available.

Turning to FIG. 1.4, FIG. 1.4 shows a diagram of the example current revision derived object (140) in accordance with one or more embodiments of the invention. The example current revision derived object (140) may include one or more in-shard references (142), one or more cross-shard references (144), and a computation specification (146). The in-shard references (142) may include information that enables the content of primary objects and/or derived objects hosted by the example node to be obtained. For example, the in-shard references (142) may be identifiers of the objects. The in-shard references (142) may include other types of information for identifying objects hosting the example current revision derived object (140) without departing from the invention The cross-shard references (144) may include information that enables the content of primary objects and/or derived objects in other nodes to be obtained. For additional information regarding cross-shard references (144), refer to FIG. 1.5.

The computation specification (146) may include information that enables a computation to be performed using the content of the objects referenced by the in-shard references (142) and/or the cross-shard references (144). For example, the computation specification (146) may be a reference to a particular type of computation supported by a data repository manager of a node. The computation specification (146) may include other types of information that specifies a computation to be performed without departing from the invention.

Turning to FIG. 1.5, as noted above, FIG. 1.5 shows a diagram of an example cross-shard reference (150) in accordance with one or more embodiments of the invention. As noted above, a cross-shard reference (150) may be a data structure that includes information that enables the content of an object in another node to be identified and/or obtained.

The example cross-shard reference (150) may include an object identifier (152) and/or a revision identifier (154). The object identifier (152) may be a data structure that includes information that enables an object in another node to be identified. For example, the object identifier (152) may be the name of the object. The object identifier (152) may be obtained from a global data map.

The revision identifier (154) may be a data structure that includes information regarding a revision of the data managed by the data managed system that is being referenced. For example, the revision identifier (154) may specify the current or previous revision of the node.

As discussed above, nodes may need to access data stored in other nodes to service data access requests. FIG. 1.6 shows a diagram of an example global data map (160) in accordance with one or more embodiments of the invention. The example global data map (160) may be a data structure that includes information that enables the location of each object of the data management system to be identified and/or obtained.

The example global data map (160) may include any number of entries (e.g., 162, 168). Each of the entries may correspond to an object of the data management system. Each entry may include an object identifier (164) that enables an object associated with the entry to be identified. Each entry may also include location information in the form of shard identifier information (166) that enables a node in which the object associated with the entry resides to be identified. For example, the object identifier (164) may be the name or indexing information of the object and the shard identifier information (166) may be identifier of the node hosting the object associated with the entry.

Turning to FIGS. 1.7-1.9, these figures illustrate examples of data structure that may be utilized by a node to manage the revision of the data that it stores. For example, the information included in these illustrated data structures may be utilized to determine when data may be revised, when data may be deleted, and when different types of data access requests may be serviced.

Turning to FIG. 1.7, FIG. 1.7 shows a diagram of the repository management data (170). The data repository management data (122) may include repository state data (172), revision data (174), a read queue (176), and a delayed action queue (178).

The repository state data (172) may include information regarding the current, past, and/or future states of the data repository stored by a node. For example, the repository state data (172) whether the data repository is in a reading state, writing state, resolving state, and/or metadata update state. The repository state data (172) may be updated as the state of the data repository changes over time (e.g., to reflect the current state).

The revision data (174) may include information usable to identify portions of the data corresponding to the current revision and the previous revision of the data repository. For example, the revision data (174) may indicate a numeral or other identifier corresponding to the current revision and a second identifier corresponding to the previous revision. The revision data (174) may be updated as the data repository is revised over time.

The revision data (174) may also include additional information regarding, for example, a number of data access requests that must be serviced before the data corresponding to the previous revision can be deleted. The revision data (174) may include other types of data that may be used to manage the data revision process without departing from the invention.

The read queue (176) may be a queue of data access requests which request to read data that have not yet been processed. When a data access requests is receives that is a read request for the data repository, the data repository manager may identify a revision corresponding to the read request and place the data access request in the read queue (176) and associate it with the identified revision.

The revision to which the data access request is keyed (i.e., associated with the identified version) may depend on the state of the data repository, as will be discussed in greater detail below. To key the data access requests, the data access requests may be associated with corresponding revisions (i.e., the current revision or the previous revision). The associations may be based on specific stored data such as labels, groupings, or other ways of identifying to which revision each data access request is keyed.

The read queue (176) may be implemented as a first in, first out queue. Consequently, earlier received read requests may be processed sooner than later received read requests. Additionally, the head of the read queue (176) may correspond to the oldest unprocessed request in the read queue (176). For additional details regarding the read queue (176), refer to FIG. 1.8.

The delayed action queue (178) may be a queue of data access requests other than read requests. For example, the delayed action queue (178) may receive write requests, metadata update requests, and/or cross-shard read requests. Like the read queue (176), the delayed action queue (178) may be implemented as a first in, first out queue. Consequently, earlier received requests may be processed sooner than later received requests.

Unlike the read queue (176), some of the requests placed in the delayed action queue may be keyed to future revisions of the data repository. For example, when a write request is received, the node may identify that processing the write request will result in the creation of a new revision. If such a data access request is queued, it may be queued to the future revision of the data repository which will be generated by virtue of processing the data access request. For additional details regarding the delayed action queue (178), refer to FIG. 1.9.

Returning to the description of the read queue (176), FIG. 1.8 shows a diagram of the read queue (176) in accordance with one or more embodiments of the invention. The read queue (176) may include any number of read requests that are ordered with respect to each other in accordance with their temporal ordering of receipt (i.e., with respect to which were received earlier in time).

The read queue (176) includes an example read request (184). The example read request (184) includes an object identifier (186) and a revision identifier (188). The object identifier (186) may be used in combination with the global data map (160, FIG. 1.6) to identify which node stores data requested by the example read request (184). For example, the object identifier (186) may be used to index into corresponding access/location information included in the global data map.

The revision identifier (188) may identify the revision (i.e., current or past via an identifier associated with that revision) for which data is requested. For example, when a read request is received and queued, it may be associated with the current revision. However, by the time the read request is processed, a write request or other type of request may have been processed that updated the current revision of the data. Consequently, the revision identifier (188) may be used to specify which version of the data is to be provided to satisfy the read request.

Turning to FIG. 1.9, FIG. 1.9 shows a diagram of the delayed action queue (190) in accordance with one or more embodiments of the invention. The delayed action queue (190), like the read queue (176), may include any number of requests that are ordered with respect to each other in accordance with their temporal ordering of receipt (i.e., with respect to which were received earlier in time). In contrast to the read queue that includes read requests, the delayed action queue (190) may include other types of data access requests such as write requests, metadata update requests, and cross-shard read requests.

In FIG. 1.9, the delayed action queue (190) is illustrated as including a single example write request (192). However, the delayed action queue (190) may include any number and type of requests without departing from the invention.

The example write request (192) may include an object identifier (194) and a revision identifier (196). Like the object identifier discussed with respect to the read queue, the object identifier (194) may be any type of identifier that allows the data which will be modified based on the write request (192) to be identified. For example, the object identifier (194) may be a name of a particular portion of data (e.g., file name, a globally unique identifier, etc.).

The revision identifier (196) may specify a future revision for the data repository. As noted above, servicing a write request may create a new revision of the data repository. The revision identifier (196) may specify the revision for that new version of the data repository generated by servicing the example write request (192).

The revision identifier (196) may be identified based on, for example, the current revision of the data repository (e.g., stored as part of the revision data (174, FIG. 1.7)) and any other future revision numbers already assigned. As revision numbers are assigned, the revision data (174, FIG. 1.7) may be updated to reflect those revisions already assigned to write requests and/or other types of requests that have not yet been processed.

In some embodiments of the invention, the delayed action queue (190) may include data access requests that are not queued to any revision. For example, metadata update requests and/or cross-shard read requests may not be keyed to any revision. As will be discussed below, by virtue of the limitations regarding the allowed state changes of the data repository, it may not be necessary to key these data access requests to any revisions for them to be properly serviced. Consequently, the total amount of data necessary to manage the requests may be reduced.

While the data structures illustrated in FIGS. 1.3-1.9 have been described as separately stored in node storage, the information included in these data structures may be integrated with other data, stored in different locations, and include additional, less, and/or different information without departing from the invention.

As discussed above, nodes may provide data management services to clients. When doing so, the nodes may (i) queue data access requests for future processing, (ii) transition through different states when processing data access requests, and (iii) update data based on the state transitions used to service the data access requests. FIGS. 2.1-4 illustrate methods that may be used to respond to the receipt of data access requests and FIGS. 5.1-5.4 illustrate methods that may be used to transition a data repository between states while servicing data access requests.

While illustrated as lists of steps, the steps shows in FIGS. 2.1-5.4 may be performed in a different order, steps may be omitted, additional steps may be performed, and/or some or all of the steps may be performed in a parallel and/or partially overlapping in time manner without departing from the invention.

FIG. 2.1 shows a flowchart of a method in accordance with one or more embodiments of the invention. The method depicted in FIG. 2.1 be used to service a read request for a data repository in accordance with one or more embodiments of the invention. The method shown in FIG. 2.1 may be performed by, for example, a node (e.g., 102, FIG. 1.1). Other components of the system illustrated in FIG. 1.1 may perform all, or a portion, of the method of FIG. 2.1 without departing from the invention.

In step 200, a read request is obtained. The read request may be obtained from a client, another node, or any other entity. The read request may be encapsulated in a network communication.

The read request may request that a portion of data stored in a data repository be provided. For example, the read request may specify an identifier for the portion of the data.

The read request may also specify whether it is a local read request or a cross-shard read request. A cross-shard read request may be a request for data stored in multiple nodes that are each independently operating to manage data managed by a data management system. Consequently, all of the data hosted by the nodes may not be at a consistent revision when a cross-shard read request is received. Accordingly, to service a cross-shard read request, as will be discussed below, the node may take particular action to ensure that data consistent with a particular revision is obtained from different nodes to service the cross-shard read request.

In step 202, it is determined whether the read request is a cross-shard read request. As noted above, the determination may be made if the read request explicitly specifies that it is a cross-shard read requests.

However, in some embodiments of the invention, the read request may not specify whether it is a cross-shard read. If the read request does not explicitly specify whether it is a cross-shard read request, the node may look up the locations (e.g., using a global data map) where the data requested by the read requests is located. If the data is located across at least two nodes, then the node may determine that the read request is a cross-shard read request.

If it is determined that the read request is a cross-shard read, then the method may proceed to FIG. 2.3. Otherwise, the method may proceed to FIG. 2.2 following step 202.

Turning to FIG. 2.2, FIG. 2.2 shows a flowchart of a method in accordance with one or more embodiments of the invention. The method depicted in FIG. 2.2 be used to service a read request that is not a cross-shard read request in accordance with one or more embodiments of the invention. The method shown in FIG. 2.2 may be performed by, for example, a node (e.g., 102, FIG. 1.1). Other components of the system illustrated in FIG. 1.1 may perform all, or a portion, of the method of FIG. 2.2 without departing from the invention.

In step 204, it is determined whether a data repository that will service the read request is in a writing state. The determination may be made using state repository data (e.g., 172, FIG. 1.7) which specifies the state of the data repository.

If it is determined that the data repository is in the writing state, then the method may proceed to step 208. If it is determined that the data repository is not in the writing state, then the method may proceed to step 208.

In step 206, the read request is added to a read queue, associated with the data repository, at the current revision of the data repository. For example, the read request may be added to the read queue and an indicator of the current revision of the data repository may also be added to the queue. Consequently, in the future when the read request is processed, the revision which should be read may be identified in addition to the particular portion of data.

The method may end following step 206.

Returning to step 204, the method may proceed to step 208 following step 204 when the data repository is in a writing state.

In step 208, the read request is added to the read queue, associated with the data repository, at the previous revision of the data repository. As will be discussed below, when the data repository enters the writing state, the data node updates the current revision as the previous revision. However, the write may not be complete while in the writing state thereby rendering the current values unreadable. Consequently, when a read request is received while in the writing state, the read request is keyed to the previous revision for which complete and readable data is available. Accordingly, the read request, now queued and keyed to the previous revision, may be immediately processed rather than requiring that the write be completed.

The method may end following step 208.

Turning to FIG. 2.3, FIG. 2.3 shows a flowchart of a method in accordance with one or more embodiments of the invention. The method depicted in FIG. 2.3 be used to service a read request that is a cross-shard read request in accordance with one or more embodiments of the invention. The method shown in FIG. 2.3 may be performed by, for example, a node (e.g., 102, FIG. 1.1). Other components of the system illustrated in FIG. 1.1 may perform all, or a portion, of the method of FIG. 2.3 without departing from the invention.

Note that prior to step 212 with respect to FIG. 2.1, it was determined that the read request is for a cross-shard read request which implicates the need to obtain data from across multiple nodes which may each include data repositories at different revision states.

In step 212, it is determined whether the data repository that will service the read request is in a writing state. The determination may be made using state repository data (e.g., 172, FIG. 1.7) which specifies the state of the data repository.

If it is determined that the data repository is in the writing state, then the method may proceed to step 216. If it is determined that the data repository is not in the writing state, then the method may proceed to step 214.

In step 214, the read request is added to a read queue, associated with the data repository, at the current revision of the data repository. For example, the read request may be added to the read queue and an indicator of the current revision of the data repository may also be added to the queue. Consequently, in the future when the read request is processed, the revision which should be read may be identified in addition to the particular portion of data.

The method may end following step 214.

Returning to step 212, the method may proceed to step 216 following step 212 when the data repository is in a writing state.

In step 216, the read request is added to the delayed action queue, associated with the data repository, at the revision of a last delayed action in the delayed action queue. In other words, the read request may be added to the delayed action queue at the last assigned revision (e.g., possibly future revision if any future revisions are associated with data access requests in the delayed action queue).

The read request may be added at the last revision by, for example, adding the read request to the delayed action queue immediately following the last data processing request in the delayed action queue. Consequently, once the last data processing request in the delayed action queue is processed, the read request may then be processed at the same revision automatically without needing the specify the particular revision at which the read request is to be processed (e.g., it may be automatically inferred that the current revision should be used to service any data access requests that do not explicitly specify revisions).

The method may end following step 216.

In addition to the actions specified in FIG. 2.3, the node may distribute copies of the cross-shard read requests to other nodes so that all appropriate data from all of the nodes impacted by the cross-shard read request may obtained and used to service the cross-shard read request. When distributing the copies, the node may reference the appropriate revision at which the read should be taken. Consequently, each of the nodes is able to appropriately identify the relevant data.

Using the method illustrated in FIGS. 2.1-2.3, read requests may be queued for future servicing in accordance with the state model used to process data access requests. By processing the read requests into queues as discussed above, the read requests may be added to appropriate queues and keyed to corresponding revisions so that the desired data is obtained for the requesting entity (e.g., rather than out of data data).

Write requests may be processed similar to the read requests discussed with respect to FIGS. 2.1-2.3. However, rather than being associated with existing revisions of the data repository, the write requests may be associated with future revisions of the data repository.

Turning to FIG. 3, FIG. 3 shows a flowchart of a method in accordance with one or more embodiments of the invention. The method depicted in FIG. 3 be used to service a write request for a data repository in accordance with one or more embodiments of the invention. The method shown in FIG. 3 may be performed by, for example, a node (e.g., 102, FIG. 1.1). Other components of the system illustrated in FIG. 1.1 may perform all, or a portion, of the method of FIG. 3 without departing from the invention.

In step 300, a write request for a data repository is obtained. The write request may be obtained from a client, another node, or any other entity. The write request may be encapsulated in a network communication.

The write request may request that a portion of data stored in a data repository be modified or new data be added to the data repository. For example, the write request may specify an identifier for a portion of data of the data repository that is to be modified, the value or other data to be written to the portion of data, etc.

In step 302, it is determined whether there are any delayed actions associated with revision in a delayed action queue for the data repository. The determination may be made based on the contents of the delayed action queue. For example, if the delayed action queue includes a write request associated with a future revision for the data repository, then it may be determined that there are delayed actions in the delayed action queue that are associated with revisions for the data repository.

If it is determined that the delayed action queue includes at least one delayed action that is associated with a revision for the data repository, then the method may proceed to step 304. Otherwise, the method may proceed to step 308.

In step 304, a new revision for the write request is identified based on the revisions and/or the current revision of the data repository. For example, as discussed above, if a write has note yet been processed, it may be stored in the delayed action queue. Because each write may be associated with a corresponding future revision for the data repository, the future writes for the data repository may need to be taken into account when determining how to key the write request obtained in step 300.

For example, if the current revision of a data repository is keyed as revision 8, any number of writes may be keyed to future revisions (e.g., 9, 10, 11). Consequently, if any writes or other actions in the delayed action queue are keyed to future revisions of the data repository, then the write request obtained in step 300 may be keyed to the next larger future revision so as not to key multiple writes to the same revision of the data repository.

For example, if a current revision is keyed as 8 and a delayed action queue includes another write request keyed as future revision 9, then the new revision may be identified as 10 (i.e., the next highest, unallocated revision).

In step 306, the write request is added to the delayed action queue, associated with the data repository, at the new revision identified in step 304. For example, the write request may be added to the delayed action queue and associated with the new revision by adding corresponding metadata specifying the future revision.

The method may end following step 306.

Returning to step 302, the method may proceed to step 308 following step 302 if it is determined that there are no delayed actions associated with revisions in the delayed actions queue.

In step 308, a new revision for the write request is identified based on the current revision of the data repository. The new revision for the write request may be identified as the next highest unallocated revision for the data repository.

For example, if the current revision of the data repository is 10, then the new revision may be identified as 11.

The method may proceed to step 306 following step 308.

Using the method illustrated in FIG. 3, write requests may be queued and keyed to appropriate revisions to associate the temporal progression of the write requests (and/or other revision associated data access requests) with the revision of the data repository. Consequently, the revision of the data repository may track the temporal relationships between modifications of the data repository.

By performing the methods illustrates in FIGS. 2.1-3, read and write requests for a data repository may be serviced. However, in some scenarios, it may be desirable to modify the underlying structure of data stored in a data repository. For example, it may be desirable to modify the data collected, the organization of the data, etc. To provide for changes in the structure of stored data, the system of FIG. 1.1 may service metadata update requests. A metadata update request may specify a change in the organization, storage, or other characteristic of data in a data repository.

For example, a metadata update may change an organization of columns in a database, remove columns in a database, or may otherwise modify the type and/or quantity of data stored in a data repository.

Figure 4:
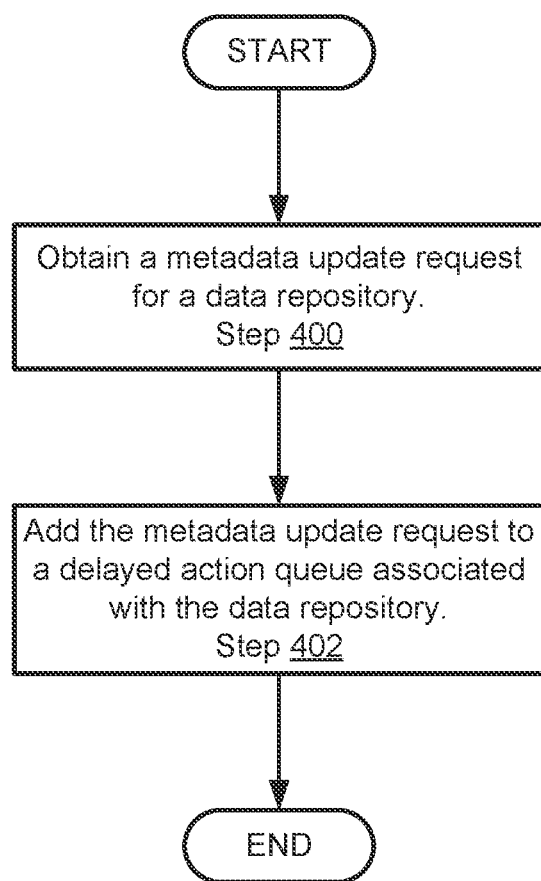
FIG. 4 shows a flowchart of a method of queuing a metadata update request in accordance with one or more embodiments of the invention.

Turning to FIG. 4, FIG. 4 shows a flowchart of a method in accordance with one or more embodiments of the invention. The method depicted in FIG. 4 may be used to service a metadata update request for a data repository in accordance with one or more embodiments of the invention. The method shown in FIG. 4 may be performed by, for example, a node (e.g., 102, FIG. 1.1). Other components of the system illustrated in FIG. 1.1 may perform all, or a portion, of the method of FIG. 4 without departing from the invention.

In step 400, a metadata update request for a data repository is obtained. The metadata update request may be obtained from a client, another node, or any other entity. The metadata update request may be encapsulated in a network communication.

The metadata update request may request that the structure of a data repository may be modified. The structure may be changed by modifying its arrangement, removing some data, adding new types of data, etc. When the structure of the data repository is modified, new key pair relationships may be formed.

In step 402, the metadata update request is added to a delayed action queue associated with the data repository. When added to the delayed action queue, the metadata update request may not be keyed to any revision of the data repository.

The method may end following step 402.

For addition details regarding processing of metadata update requests, refer to FIGS. 5.1-5.5.

Using the methods illustrated in FIGS. 2.1-4, different types of requests may be added to queues for later processing as resources for processing the data access requests become available.

To process data access requests, the node may operate in accordance with a state model that transitions between four states including a reading state, writing state, resolving state, and metadata update state. The default state may be a reading state in which (i) no data access requests are in a delayed action queue and (ii) read requests are processed. FIGS. 5.1-5.5 show diagrams of the operation of the node to process queued data access requests in accordance with the state model in accordance with one or more embodiments of the invention.

Turning to FIG. 5.1, FIG. 5.1 shows a flowchart of a method in accordance with one or more embodiments of the invention. The method depicted in FIG. 5.1 may be used to operate a data node based on a state model in accordance with one or more embodiments of the invention. The method shown in FIG. 5.1 may be performed by, for example, a node (e.g., 102, FIG. 1.1). Other components of the system illustrated in FIG. 1.1 may perform all, or a portion, of the method of FIG. 5.1 without departing from the invention.

Prior to step 500, the data repository may be in a reading state, resolving state, or a metadata update state. Once the activity associated with those states is complete, the node may ascertain that at least one data access request is present in a delayed action queue. In response to the determination, then the node may perform the method illustrated in FIG. 5.1.

In step 500, it is determined whether a data access request at the head of the delayed action queue is a write request. Being at the head of the delayed action queue indicates that the data access request will be the next request from the delayed action queue to be processed by the node. The determination may be made based on a type of the data access request.

If it is determined that the data access request is a write request, then the method may proceed to FIG. 5.2. If it is determined that the data access request is not a write request, then the method may proceed to FIG. 5.3.

Turning to FIG. 5.2, FIG. 5.2 shows a flowchart of a method in accordance with one or more embodiments of the invention. The method depicted in FIG. 5.2 may be used to service a write request for a data repository in accordance with one or more embodiments of the invention. The method shown in FIG. 5.2 may be performed by, for example, a node (e.g., 102, FIG. 1.1). Other components of the system illustrated in FIG. 1.1 may perform all, or a portion, of the method of FIG. 5.2 without departing from the invention.

When the method illustrated in FIG. 5.2 is performed, the data repository may be transitioned into a writing state. For example, prior to performing step 510, the node may update its metadata regarding the activity state of the data repository to be in the writing state. Consequently, when data access requests are obtained while the method illustrated in FIG. 5.2 is performed, the node may place them into queues and appropriately key the requests based, in part, on the activity state of the data repository.

In step 510, the current revision and previous revision of the data repository are updated. The previous revision may be updated by copying the values of the current revision into the previous revision.

For example, with respect to FIG. 1.3, the value of one of the current revision primary objects (132) may be copied to one of the previous revision primary objects (134) associated with the primary object. If the current revision primary object and associated previous revision primary object have the same value, then a copy operation may be avoided but may be treated as through it had been completed. Similar modifications may be made to the current and previous derived objects (e.g., 136, 138).

In addition to modifying the value of the previous revision primary objects (134), data repository management data (122, FIG. 1.7) may also be updated. Specifically, the revision data (174, FIG. 1.7) to indicate that the current revision and previous revision are now associated with higher revision numbers.

For example, consider a scenario where the revision data indicates that the current revision is associated with revision number 7 and the previous revision is associated with revision number 6. This data may be updated in step 510 to indicate that the current revision is now associated with revision number 8 while the previous revision is now associated with revision number 7.

At this point in time, by virtue of the change in revision number, no read requests are keyed to the revision number associated with the current revision. Additionally, as described with respect to FIG. 2.2, when read requests are obtained, they may only be keyed to the previous revision of the data repository. Accordingly, the data access requests may be serviced without delay by virtue of the write request being processed in FIG. 5.2.

In step 512, it is determined whether multiple write requests are sequentially queued at the head of the delayed action queue. The determination may be made based on the ordering and types of the data access requests in the delayed action queue.

If it is determined that multiple write requests are queued in the delayed action queue, then the method may proceed to step 514. Otherwise, the method may proceed to step 516 following step 512.

In step 514, the sequentially queued write requests in the delayed action queue are processed while (i) servicing read requests and (ii) queueing all other requests in the delayed action queue.

The write requests may be processed by updating the current revision of the data repository based on the write requests. For example, consider a scenario where a data repository stores data object A having a current revision value of 25. If a first write request indicates that the value of A is to be changed to 12, then the current revision value may be updated to 12. Similarly, if a second write request indicates that the value of A is to be changed to 18, then the current revision value may be updated to 18. These sequential write requests may be processed as a batch.

Once the complete modification of the current revision value has been obtained based on the sequential write requests, then the system may calculate a delta between the previous value and the new value of the current revision. In the above example, the delta may be −7 (i.e., 25−18=−7). This delta may be distributed to (i) other nodes that may maintain a copy of the object impacted by the write request, (ii) other nodes that maintain derived objects that depend on the value of the object, and (iii) internally to update derived values that may be based on the object. Consequently, only a single delta value may be distributed for the multiple sequential write requests that are processed.

To service read requests while processing the sequentially queued write requests, the node may interleave servicing the read requests with processing of the sequentially queued writes. The node may interleave these operations in any manner without departing from the invention.

For example, the node may utilize time slicing into different periods of time during which read requests are processed and write requests are processed. Consequently, the system may still remain highly responsive from the view point of a user by virtue of this interleaving approach.

To service the read requests, read requests may be sequentially read from the read queue and processed by reading corresponding data from the data repository at a revision specified by the read requests (or inferred as being the current revision if no revision indicator is associated with the read requests.

In addition to read requests, other types of requests may be obtained while the sequential write requests are being processed. These other types of data access requests (e.g., writes, metadata updates, cross-shard reads, etc.) may be added to the delayed action queue as described with respect to FIGS. 2.1-4.

The method may proceed to FIG. 5.3 following step 514.

Returning to Step 512, the system may proceed to step 516 following step 514 if it is determined that only a single write request is present at the head of the delayed action queue.

In step 514, the write request at the head of the delayed action queue is processed while (i) servicing read requests and (ii) queueing all other requests in the delayed action queue. The write request may be processed similar to that described with respect to step 514. However, the generated delta may only be based on the single change due to the write request at the head of the delayed action queue.

The method may proceed to FIG. 5.3 following step 516.

Following steps 514 and 516, write requests from a delayed action queue may be serviced. However, while processing these write requests, read requests may be received, queued for processing, and associated with a previous revision of the data repository. Consequently, additional write requests or other types of data access requests that may cause the previous revision value to be unavailable may not be processed until these read requests are serviced. Accordingly, following steps 514 and 156, the data repository may enter a resolving state. During the resolving state, the method illustrated in FIG. 5.3 may be performed.

Turning to FIG. 5.3, FIG. 5.3 shows a flowchart of a method in accordance with one or more embodiments of the invention. The method depicted in FIG. 5.3 may be used to resolve open read requests in accordance with one or more embodiments of the invention. The method shown in FIG. 5.3 may be performed by, for example, a node (e.g., 102, FIG. 1.1). Other components of the system illustrated in FIG. 1.1 may perform all, or a portion, of the method of FIG. 5.3 without departing from the invention.

In step 520, all of the queued read requests in the read request queue that are associated with the previous revision of the data repository are processed. Each of the read requests may be processed by (i) identifying previous revision data necessary to service the requests and (ii) distributing copies of the previous revision data to entities based on the read requests. Consequently, following step 520, no pending requests may need the previous revision data of the data repository to be serviced.

In step 522, it is determined whether any data access requests are in the delayed action queue. If the delayed action queue is empty, then the method may proceed to FIG. 5.5. Proceeding to FIG. 5.5 may transition the data repository to a reading state.

If the delayed action queue is not empty, then the method may proceed to step 524.

In step 524, it is determined whether the data access request at the head of the delayed action queue is a metadata update request. If the data access request is a metadata update request, then the method may proceed to FIG. 5.4 following step 524. Proceeding to FIG. 5.4 may transition the data repository to a metadata update state.

If the data access request is not a metadata update request, then the method may proceed to step 526 following step 524.

In step 526, it is determined whether the request at the head of the delayed action queue is a cross-shard read request.

If the data access request is a cross-shard read request, then the method may proceed to step 528 following step 526.

If the data access request is not a cross-shard read request, then the method may proceed to FIG. 5.1 following step 526.

In step 528, the cross-shard read request in the delayed action queue is processed as a read request at the current revision. As discussed above, cross-shard read requests may not be explicitly associated with any revision of the data repository. Consequently, the node may infer based on the lack of explicit reference that the cross-shard read is a read request at the current revision.

Additionally, by virtue of processing a write request in FIG. 5.2 previous to performing the method illustrated in FIG. 5.3, the cross-shard read, by virtue of its placement in the delayed action queue immediately following the write request that was processed in FIG. 5.2, is effectively keyed to the same revision as the write request. Thus, by virtue of its placement in the queue, the cross-shard read request is effectively keyed without requiring additional data to be stored to indicate an explicit keying of the cross-shard read request to the current revision value.

The method may proceed to FIG. 5.1 following step 528.

As noted in FIG. 5.3, in some cases, the data repository may be transitioned to a metadata update state following step 524. In such a scenario, the method illustrated in FIG. 5.4 may be performed while in the metadata update state. As noted above, processing of both read requests and write requests may be suspended while in the metadata update state. Additionally, by virtue of performing the method illustrated in FIG. 5.3 prior to entering the metadata update state, no unprocessed data access requests may be keyed to or otherwise rely on the previous revision data of the data repository.

Turning to FIG. 5.4, FIG. 5.4 shows a flowchart of a method in accordance with one or more embodiments of the invention. The method depicted in FIG. 5.4 may be used to resolve a metadata request in accordance with one or more embodiments of the invention. The method shown in FIG. 5.4 may be performed by, for example, a node (e.g., 102, FIG. 1.1). Other components of the system illustrated in FIG. 1.1 may perform all, or a portion, of the method of FIG. 5.4 without departing from the invention.

In step 540, the structure of a current revision of data objects is updated based on the metadata update request at the head of the delayed action queue. As noted above, a metadata update request may specify a change in the structure of data in the data repository. This change may relate to the organizational layout, content, and/or other characteristic of the data repository.

Processing the metadata update may modify this structure, content, etc. of the data repository to match that specified by the metadata update request. For example, the arrangement of the current revision data may be modified, new data may be added, existing data may be removed, etc.

In step 542, the previous revision of the data objects are updated as being unavailable. For example, identifiers or other indicators of the unavailability of these data objects may replace the values of the previous revision data objects (e.g., both primary and derived objects).

The method may proceed to FIG. 5.1 following step 542.

Thus, using the method illustrated in FIG. 5.4, the structure of data in the data repository may be modified while ensuring that read requests and write requests may continue to be serviced following the modification.

As noted in FIG. 5.3, in some cases, the data repository may be transitioned to a reading state following step 522. In such a scenario, the method illustrated in FIG. 5.5 may be performed while in the reading state. The reading state may be the default state of the data repository when no other types of data requests (i.e., other than read requests) are queued for servicing.

Turning to FIG. 5.5, FIG. 5.5 shows a flowchart of a method in accordance with one or more embodiments of the invention. The method depicted in FIG. 5.5 may be used to service read requests while no other requests are pending in a delayed action queue in accordance with one or more embodiments of the invention. The method shown in FIG. 5.5 may be performed by, for example, a node (e.g., 102, FIG. 1.1). Other components of the system illustrated in FIG. 1.1 may perform all, or a portion, of the method of FIG. 5.5 without departing from the invention.

In step 550, read requests are processed until a new request enters the delayed action queue. When a data access request enters the delayed action queue, the data repository may immediately transition out of the reading state and proceed to perform the method illustrated in FIG. 5.5.

The read requests may be processed by providing requesting entities with copies of requested data at revisions corresponding to those keyed to the key requests.

Using the methods illustrated in FIGS. 5.1-5.5, a node may process requests in accordance with a state model thereby ensuring that desired data is both stored and providing in a responsive manner.

To further clarify embodiments of the invention, non-limiting examples are provided in FIGS. 6.1-6.8, 6.9-6.11, and 6.12-6.14. Each of these figures may illustrate a system similar to that illustrated in FIG. 1.1 at different points in time. For the sake of brevity, only a limited number of components of the system of FIG. 1.1 are shown in FIGS. 6.1-6.14.

Example

Consider a scenario as illustrated in FIG. 6.1 in which a data management system (600) is providing services to clients (602). In FIGS. 6.1-6.14, data access requests sent by the clients (602) to the data management system (600) are disposed on the arrow between these elements. Additionally, in each of FIGS. 6.1-6.14, a diagram indicating the current activity state of the data repository is indicated by the large arrow pointing towards the box associated with the corresponding activity state. For example, in FIG. 6.1, the arrow is pointing toward the reading state box thereby indicating that the data repository managed by the data management system (600) is in the reading state. Lastly, in each of FIGS. 6.1-6.14, a diagram of the data used to manage servicing of the data access requests is provided. Specifically, the diagram indicates the current revision (610) of the data repository, previous revision (612) of the data repository, requests that have been placed into a reading queue (620), and requests that have been placed into a delayed action queue (630).

As seen in FIG. 6.1, while the data repository is in a reading state, the clients (602) send three data access requests: a first read (650), a first write (652), and a second read (654). The data management system (600) obtains these data access requests.

Turning to FIG. 6.2, when the data management system (600) obtains the first read (650), the data management system (600) places the first read (650) in the reading queue (620). Because the read was obtained while the data repository was in the read state, the first read is keyed to revision 0 as indicated by the diagram.

Turning to FIG. 6.3, the data management system next obtains the first write (652) and places it in the delayed action queue (630) at revision 1 (the first allowable future revision). The data management system (600) then begins processing the first write (652) which causes the data management system (600) to transition to the writing state. As part of the transition, the data management system (600) updates the current revision to 1 and copies the data in the current revision to the previous revision so that it will be available even though the first write (652) is being processed.

Turning to FIG. 6.4, the data management system (600), while processing the first write (652), obtains the second read (654) and places it in the read queue (620). Unlike the first read that was keyed based on the current revision, the second read is queued based on the previous revision (i.e., 0) because the data repository is in the writing state. Consequently, when the first read and second read are serviced in the future, both are serviced using the previous revision of the data repository rather than the current revision.

While these reads could be serviced while also servicing the first write, the data management system (600) lacks sufficient computing resources to do so. Consequently, turning to FIG. 6.5, the data repository transitions to the resolving state to being processing the first and second read (which both require access to the previous revision data). While in the resolving state, a second write (656) and third read (658) are obtained from the clients (602).

Turning to FIG. 6.6, because the data repository is in the resolving state, the second write (656) is added to the delayed action queue (630) and keyed to a second revision (the next available future revision). The third read (658) is similarly added to the reading queue (620) but is, in contrast, keyed to the current revision (i.e., 1).

Turning to FIG. 6.7, the data management services both the first and second read requests while in the resolving state leaving only the third read (658) and second write (656) for processing. Based on these pending data access requests, the data management system (600), as illustrated in FIG. 6.8, transition to the writing state. During this transition, the data management system (600) updates the current revision (610)

to 2, the previous revision (612) to 1, and copies the current revision data to the previous revision data so that the data associated with revision 1 is still highly available while in the writing state.

While in the writing state, data management system (600) processing the second write (656) by modifying the current revision data based on the write and services the third read (658) using the previous revision data.

The data repository then enters a reading state, as illustrated in FIG. 6.9, because no pending delayed actions are present in the delayed action queue (630). While in the reading state, the data management system (600) obtains a third write (660) and a cross-shard read (662).

Turning to FIG. 10, the data repository enters the writing state and the current revision is updated to 3, the previous revision is updated to 2, and the current revision data is copies to the previous revision data. Additionally, the third write (660) is added to the delayed action queue (630) and keyed to a third revision (next available revision number). The cross-shard read (662) is also added to the delayed action queue (630) immediately following the third write (660). The cross-shard read (662) is not keyed to any revisions.

The data management system then processing the third write (660) by modifying the current revision data. After doing so, as seen in FIG. 611, the data repository enters the resolving state due to the presence of the cross-shard read (662) in the delayed action queue. While in the resolving state, the data management system (600) converts the cross shard read into a fourth read (664) keyed to the current revision and added to the reading queue (620).

Because no data access requests are in the delayed action queue (630), the data repository transitions to the reading state as illustrated in FIG. 612 and services the fourth read (664) using the current revision data.

While in the reading state, the data management system (600) obtains a firth read (666) and a metadata update (668). As seen in FIG. 6.13, the data management system (600) add the metadata update (668) to the delayed action queue (630), adds the fifth read (664) to the reading queue (620) at the current revision (i.e., 3), and transition the data repository to the resolving state (e.g., because of the presence of the metadata update (668) in the delayed action queue (630)).

While in the resolving state, the fifth read (664) is processed. After processing the fifth read (664), the data repository transitions to the metadata update state as seen in FIG. 6.14. While in the metadata update state, the data management system (600) processes the metadata update (668) resulting in the previous revision being no longer available and the structure of the current revision being updated based on the metadata update (668).

End of Example

Any of the components of FIG. 1.1 may be implemented as distributed computing devices. A distributed computing device may refer to functionality provided by a logical device that utilizes the computing resources of one or more separate and/or distinct computing devices.

Figure 7:
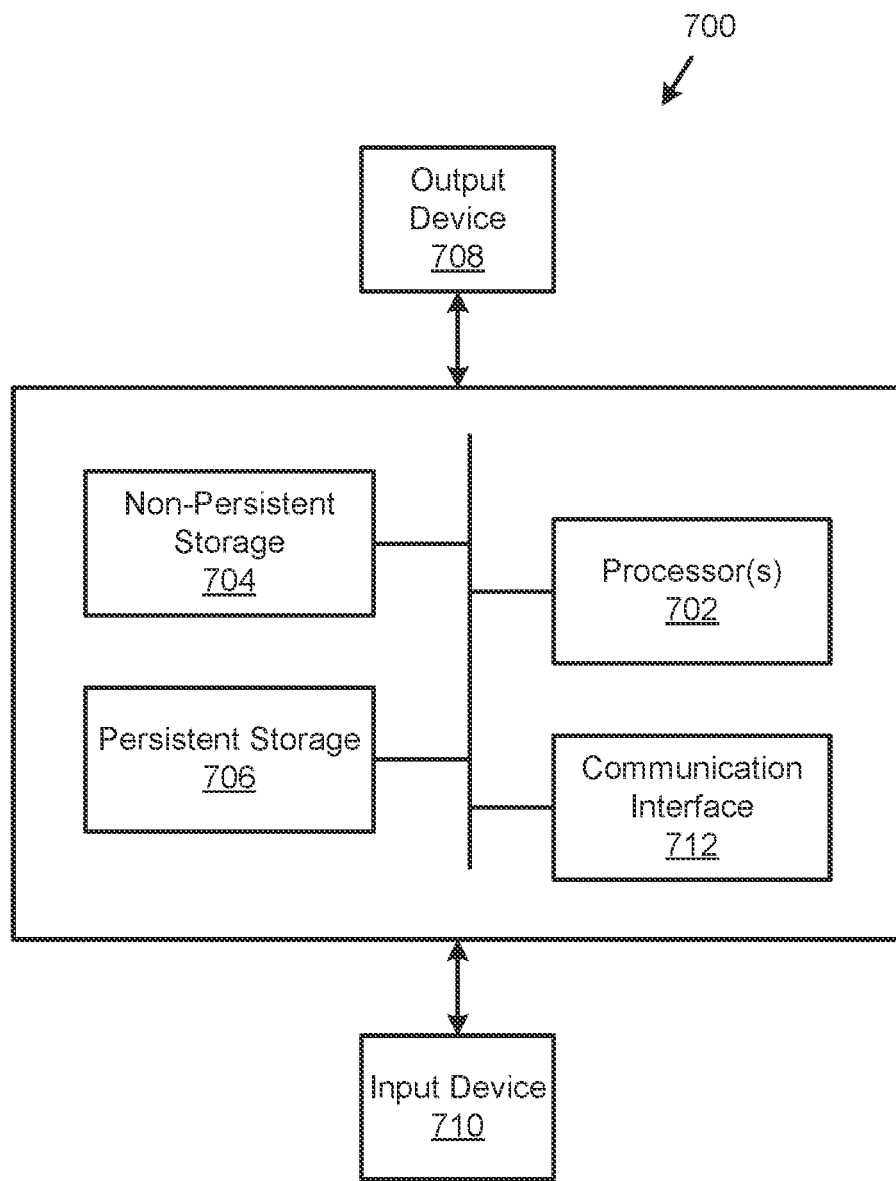
FIG. 7 shows a diagram of a computing device in accordance with one or more embodiments of the invention.

As discussed above, embodiments of the invention may be implemented using computing devices. FIG. 7 shows a diagram of a computing device in accordance with one or more embodiments of the invention. The computing device (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), input devices (710), output devices (708), and numerous other elements (not shown) and functionalities. Each of these components is described below.

In one embodiment of the invention, the computer processor(s) (702) may be an integrated circuit for processing instructions. For example, the computer processor(s) may be one or more cores or micro-cores of a processor. The computing device (700) may also include one or more input devices (710), such as a touchscreen, keyboard, mouse, microphone, touchpad, electronic pen, or any other type of input device. Further, the communication interface (712) may include an integrated circuit for connecting the computing device (700) to a network (not shown) (e.g., a local area network (LAN), a wide area network (WAN) such as the Internet, mobile network, or any other type of network) and/or to another device, such as another computing device.

In one embodiment of the invention, the computing device (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing devices exist, and the aforementioned input and output device(s) may take other forms.

Embodiments of the invention may provide a system that manages data in a manner that improves a user experience. Specifically, the system may manage data in a manner consistent with a state model that makes reading of data while also writing data in parallel possible. Consequently, writes that may otherwise leave data in an indeterminate state (i.e., unreadable) may be avoided by ensuring that data necessary to service reads is available at all times. Consequently, reads and writes may be interleaved while ensuring that the data appears to be highly available from the perspective of the user.

Further embodiments of the invention may provide for the management and servicing of cross-shard data access requests. Specifically, embodiments of the invention may manage the processing of queuing and keying requests in a manner that ensures that cross-shard reads each return data that is revision consistent with the other reads. Consequently, when a cross-shard read is initiated, the corresponding returned values will be consistent with a desired revision regardless of the revision state of each shard of the system.

Thus, embodiments of the invention may address problems arising in the field of distributed computations that impact both the efficiency of performing such computations and user experience derived from the performance of computations (e.g., data storage, reading, generation activities). These problems may arise due to the nature of the technological environment of distributed systems that include data that is distributed across any number of nodes and may be inconsistent with the data of the other nodes at any point in time.

The problems discussed above should be understood as being examples of problems solved by embodiments of the invention disclosed herein and the invention should not be limited to solving the same/similar problems. The disclosed invention is broadly applicable to address a range of problems beyond those discussed herein.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A computing device of a data management system that manages sharded distributed storage of high accessibility data across a plurality of computing devices of the data management system, comprising:
    storage of the computing device adapted to store a portion of the high accessibility data corresponding to a shard that is divided into revisions, wherein the portion of the high accessibility data is managed based on an activity state model comprising a writing state, a resolving state, a metadata update state, and a reading state; and
    a processor of the computing device programmed to:
        obtain a cross-shard read request for the portion of the high accessibility data, wherein the high accessibility data is stored on the plurality of computing devices of the data management system;
        make a determination that the portion of the high accessibility data is not in the reading state;
        in response to the determination, add the cross-shard read request to a delayed action queue at a revision of a last delayed action in the delayed action queue, wherein the revision specifies the state of the portion of the high accessibility data after the last delayed action is performed; and
        after processing the last delayed action in the delayed action queue:
            transition the cross-shard read request to the resolving state; and
            while in the resolving state:
                convert the cross-shard read request to a read request; and
                process the read request.

2. The computing device of claim 1, wherein converting the cross-shard read request to the read request comprises:
    adding a new read request to a read queue at the revision of the last delayed action; and
    remove the cross-shard read request from the delayed action queue.

3. The computing device of claim 2, wherein processing the read request comprises:
    sequentially processing read requests from a head of the read request queue until the new read request is processed.

4. The computing device of claim 1, wherein while in the resolving state:
    received write requests are not processed; and
    the received write requests are added to the delayed action queue.

5. The computing device of claim 1, wherein the processor is further programmed to:

obtain a second cross-shard read request for the high accessibility data while the portion of the high accessibility data is in the reading state;
    while in the reading state, add the cross-shard read request to a read queue at a current revision of the portion of the high accessibility data.

6. The computing device of claim 1, wherein the processor is further programmed to:
    obtain a second read request for the high accessibility data while the portion of the high accessibility data is not in the reading state;
    while not in the reading state, add the second read request to a read queue.

7. The computing device of claim 6, wherein the processor is further programmed to:
    obtain the second read request for the high accessibility data while the portion of the high accessibility data is in the reading state;
    while in the reading state, add the second read request to the read queue which is continuously processed while the portion of the high accessibility data is in any of the read state, the write state, and the resolving state.

8. A method for managing sharded distributed storage of high accessibility data across computing devices of a data management system, comprising:
    obtaining, by a processor of a computing device of the computing devices, a cross-shard read request for a portion of the high accessibility data, wherein the high accessibility data is stored on the plurality of computing devices of the data management system;
    making a determination that the portion of the high accessibility data is not in a reading state;
    in response to the determination, adding the cross-shard read request to a delayed action queue at a revision of a last delayed action in the delayed action queue, wherein the revision specifies a state of the portion of the high accessibility data after the last delayed action is performed; and
    after processing the last delayed action in the delayed action queue:
        transitioning the cross-shard read request to a resolving state; and
        while in the resolving state:
            converting the cross-shard read request to a read request; and
            processing the read request.

9. The method of claim 8, wherein converting the cross-shard read request to the read request comprises:
    adding a new read request to a read queue at the revision of the last delayed action; and
    remove the cross-shard read request from the delayed action queue.

10. The method of claim 9, wherein processing the read request comprises:
    sequentially processing read requests from a head of the read request queue until the new read request is processed.

11. The method of claim 8, wherein while in the resolving state:
    received write requests are not processed; and
    the received write requests are added to the delayed action queue.

12. The method of claim 8, wherein the processor is further programmed to:
    obtain a second cross-shard read request for the high accessibility data while the portion of the high accessibility data is in the reading state;

while in the reading state, add the cross-shard read request to a read queue at a current revision of the portion of the high accessibility data.

13. The method of claim 8, wherein the processor is further programmed to:
obtain a second read request for the high accessibility data while the portion of the high accessibility data is not in the reading state;
while not in the reading state, add the second read request to a read queue.

14. The method of claim 13, wherein the processor is further programmed to:
obtain the second read request for the high accessibility data while the portion of the high accessibility data is in the reading state;
while in the reading state, add the second read request to the read queue which is continuously processed while the portion of the high accessibility data is in any of the read state, a write state, and the resolving state.

15. A non-transitory computer readable medium comprising computer readable program code, which when executed by a computer processor enables the computer processor to perform a method for managing sharded distributed storage of high accessibility data across computing devices of a data management system, the method comprising:
obtaining, by a processor of a computing device of the computing devices, a cross-shard read request for a portion of the high accessibility data, wherein the high accessibility data is stored on the plurality of computing devices of the data management system;
making a determination that the portion of the high accessibility data is not in a reading state;
in response to the determination, adding the cross-shard read request to a delayed action queue at a revision of a last delayed action in the delayed action queue, wherein the revision specifies a state of the portion of the high accessibility data after the last delayed action is performed; and
after processing the last delayed action in the delayed action queue:
transitioning the cross-shard read request to a resolving state; and
while in the resolving state:
converting the cross-shard read request to a read request; and
processing the read request.

16. The non-transitory computer readable medium of claim 15, wherein converting the cross-shard read request to read request comprises:
adding a new read request to a read queue at the revision of the last delayed action; and
remove the cross-shard read request from the delayed action queue.

17. The non-transitory computer readable medium of claim 16, wherein processing the read request comprises:
sequentially processing read requests from a head of the read request queue until the new read request is processed.

18. The non-transitory computer readable medium of claim 15, wherein while in the resolving state:
received write requests are not processed; and
the received write requests are added to the delayed action queue.

19. The non-transitory computer readable medium of claim 15, wherein the processor is further programmed to:
obtain a second cross-shard read request for the high accessibility data while the portion of the high accessibility data is in the reading state;
while in the reading state, add the cross-shard read request to a read queue at a current revision of the portion of the high accessibility data.

20. The non-transitory computer readable medium of claim 15, wherein the processor is further programmed to:
obtain a second read request for the high accessibility data while the portion of the high accessibility data is not in the reading state;
while not in the reading state, add the second read request to a read queue.

* * * * *